United States Patent
Kondoh et al.

(10) Patent No.: US 10,095,365 B2
(45) Date of Patent: Oct. 9, 2018

(54) POSITION DETECTING METHOD FOR TOUCHSCREEN PANEL, TOUCHSCREEN PANEL, AND ELECTRONIC APPARATUS

(71) Applicant: FUJITSU COMPONENT LIMITED, Tokyo (JP)

(72) Inventors: Koichi Kondoh, Tokyo (JP); Takashi Nakajima, Tokyo (JP); Nobuyoshi Shimizu, Tokyo (JP); Masanobu Hayama, Tokyo (JP); Norio Endo, Tokyo (JP); Daisuke Ichikawa, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 15/006,308

(22) Filed: Jan. 26, 2016

(65) Prior Publication Data
US 2016/0139713 A1 May 19, 2016

Related U.S. Application Data

(62) Division of application No. 12/759,791, filed on Apr. 14, 2010, now Pat. No. 9,280,249.

(30) Foreign Application Priority Data

Apr. 22, 2009 (JP) .................................. 2009-104366
Jul. 1, 2009 (JP) .................................. 2009-157168

(51) Int. Cl.
G06F 3/045 (2006.01)
G06F 3/041 (2006.01)
G06F 3/0488 (2013.01)

(52) U.S. Cl.
CPC ............ *G06F 3/045* (2013.01); *G06F 3/0416* (2013.01); *G06F 3/0488* (2013.01); *G06F 2203/04104* (2013.01); *G06F 2203/04808* (2013.01)

(58) Field of Classification Search
CPC ....................................... G06F 3/041–3/04897
See application file for complete search history.

(56) References Cited

U.S. PATENT DOCUMENTS

| 4,670,293 A | 6/1987 | Yamano et al. |
| 5,757,363 A | 5/1998 | Oishi et al. |
| 8,106,891 B2 * | 1/2012 | Kong .................... G06F 3/0416 345/173 |

(Continued)

FOREIGN PATENT DOCUMENTS

| CN | 1813237 | 8/2006 |
| CN | 101398736 | 4/2009 |

(Continued)

*Primary Examiner* — Gene W Lee
(74) *Attorney, Agent, or Firm* — IPUSA, PLLC

(57) ABSTRACT

A position detecting method for a touchscreen panel includes the steps of (a) determining the presence or absence of contact with the touchscreen panel on a conductive film divided into multiple conductive regions; (b) measuring a time after the detection of the absence of the contact and determining whether the measured time is less than a predetermined time if step (a) determines the absence of the contact; and (c) determining the continuance of the contact if the measured time is less than the predetermined time.

9 Claims, 30 Drawing Sheets

(56) References Cited

U.S. PATENT DOCUMENTS

| | | | |
|---|---|---|---|
| 8,115,744 B2* | 2/2012 | Kong | G06F 3/041 |
| | | | 345/173 |
| 8,139,040 B2* | 3/2012 | Kong | G06F 3/0416 |
| | | | 345/173 |
| 2005/0150543 A1 | 7/2005 | Nakashima et al. | |
| 2005/0156881 A1 | 7/2005 | Trent, Jr. et al. | |
| 2007/0046643 A1 | 3/2007 | Hillis et al. | |
| 2007/0097084 A1 | 5/2007 | Niijima | |
| 2007/0132710 A1 | 6/2007 | Tateuchi et al. | |
| 2007/0273658 A1 | 11/2007 | Yli-Nokari et al. | |
| 2009/0225051 A1 | 9/2009 | Kuo | |
| 2010/0051433 A1 | 3/2010 | Kong et al. | |
| 2010/0053094 A1* | 3/2010 | Kong | G06F 3/0412 |
| | | | 345/173 |
| 2010/0259493 A1 | 10/2010 | Chang et al. | |
| 2010/0309171 A1* | 12/2010 | Hsieh | G06F 3/0416 |
| | | | 345/204 |

FOREIGN PATENT DOCUMENTS

| | | |
|---|---|---|
| CN | 101604220 | 12/2009 |
| EP | 0631256 | 12/1994 |
| EP | 1830248 | 9/2007 |
| JP | 2000-010720 | 1/2000 |
| JP | 2000-112642 | 4/2000 |
| JP | 2004-206681 | 7/2004 |
| JP | 2004-272722 | 9/2004 |
| JP | 2005-182737 | 7/2005 |
| JP | 2005-346583 | 12/2005 |
| JP | 2006-039667 | 2/2006 |
| JP | 2006-185338 | 7/2006 |
| JP | 2006-244005 | 9/2006 |
| JP | 2008-293129 | 12/2008 |
| TW | 200743993 | 12/2007 |
| TW | 200915156 | 4/2009 |
| WO | 2007/069799 | 6/2007 |

* cited by examiner

FIG.17

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |

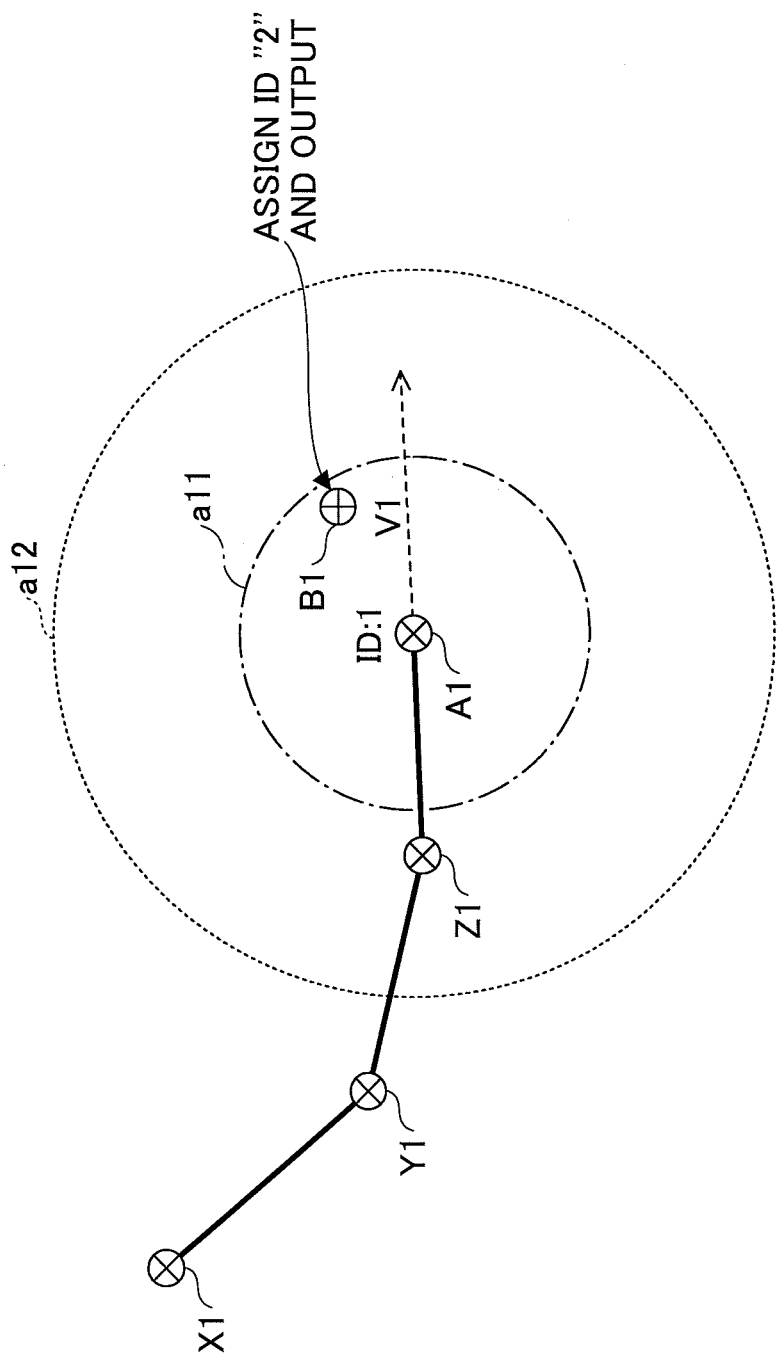

POSITION DETECTING METHOD FOR TOUCHSCREEN PANEL, TOUCHSCREEN PANEL, AND ELECTRONIC APPARATUS

CROSS-REFERENCE TO RELATED APPLICATIONS

The present application is a division of U.S. patent application Ser. No. 12/759,791, filed on Apr. 14, 2010, which is based upon and claims the benefit of priority of Japanese Patent Applications No. 2009-104366, filed on Apr. 22, 2009, and No. 2009-157168, filed on Jul. 1, 2009. The disclosures of the prior applications are hereby incorporated herein in their entirety by reference.

BACKGROUND OF THE INVENTION

1. Field of the Invention

The present invention relates to a position detecting method for a touchscreen panel, a touchscreen panel, and an electronic apparatus.

2. Description of the Related Art

The touchscreen panel is an input device that allows direct inputs to a display. The touchscreen panel is provided and used on the front surface of the display. The touchscreen panel, which allows direct inputs based on visually acquired information on the display, has been widely used for various purposes.

Of touchscreen panels, those using resistive films are well known. In touchscreen panels of the resistive-film type, an upper electrode substrate and a lower electrode substrate are provided so that their respective transparent conductive films face each other, so as to allow the transparent conductive films to come into contact with each other in response to an application of force to a point on the upper electrode substrate. As a result, it is possible to detect the position of the point to which force has been applied.

Touchscreen panels of the resistive-film type may be divided roughly into a four-wire type and a five-wire type. The four-wire type of touch panel has X-axis electrodes provided on one of the upper electrode substrate and the lower electrode substrate and Y-axis electrodes provided on the other one of the upper electrode substrate and the lower electrode substrate.

On the other hand, the five-wire type of touchscreen panel has both the X-axis and the Y-axis electrodes provided on the lower electrode substrate, and has the upper electrode substrate serve as a probe for detecting voltage. (See, for example, Japanese Laid-Open Patent Application No. 2004-272722 and Japanese Laid-Open Patent Application No. 2008-293129.)

By way of example, a description is given, with reference to FIG. 1 and FIG. 2, of a five-wire type of touchscreen panel. FIG. 1 is a perspective view of a five-wire type of touchscreen panel. FIG. 2 is a schematic cross-sectional view of the five-wire type of touchscreen panel.

Referring to FIG. 1 and FIG. 2, a five-wire type of touchscreen panel 200 (hereinafter, "touchscreen panel 200") includes a film 210 and a glass 220. The film 210 has a transparent conductive film 230 formed on its one side and serves as an upper electrode substrate. The glass 220 has a transparent conductive film 240 formed on its one side and serves as a lower electrode substrate. The film 210 and the glass 220 are provided so that the transparent conductive film 230 and the transparent conductive film 240 face each other across a spacer 250. The touchscreen panel 200 is electrically connected to a host computer (not graphically illustrated) through a cable 260.

FIGS. 3A and 3B are diagrams illustrating a method of detecting coordinates in the touchscreen panel 200. According to the touchscreen panel 200 having the above-described configuration, voltage is applied alternately in the X-axis and the Y-axis directions with electrodes 241, 242, 243, and 244 provided at the four side ends of the transparent conductive film 240 as illustrated in FIG. 3A. In response to the transparent conductive film 230 and the transparent conductive film 240 coming into contact with each other at contact point (position) A, an electric potential Va is detected through the transparent conductive film 230, thereby detecting an X-axis coordinate position and a Y-axis coordinate position as illustrated in FIG. 3B.

SUMMARY OF THE INVENTION

According to one aspect of the present invention, a position detecting method for a touchscreen panel includes the steps of: (a) determining a presence or absence of a contact with the touchscreen panel on a conductive film divided into a plurality of conductive regions; (b) measuring a time after a detection of the absence of the contact and determining whether the measured time is less than a predetermined time if step (a) determines the absence of the contact; and (c) determining a continuance of the contact if the measured time is less than the predetermined time.

According to one aspect of the present invention, a position detecting method for a touchscreen panel includes the steps of: (a) determining a presence or absence of a contact with the touchscreen panel in an adjacent two of a plurality of conductive regions into which a conductive film of the touchscreen panel is divided; (b) calculating coordinates of two positions of the contact in the adjacent two of the conductive regions if step (a) determines the presence of the contact; (c) calculating an interval between the two positions of the contact based on the coordinates of the two positions, and comparing the calculated interval with a predetermined distance; and (d) calculating an average of the coordinates of the two positions and determining the average as coordinates of a position of the contact if the calculated interval is less than the predetermined distance.

According to one aspect of the present invention, a position detecting method for a touchscreen panel includes the steps of: (a) sequentially scanning a plurality of conductive regions, into which a conductive film of the touchscreen panel is divided, on a one-by-one basis for detecting a first position of a contact with the touchscreen panel in the conductive regions; (b) sequentially scanning the conductive regions on the one-by-one basis for detecting a second position of the contact with the touchscreen panel in the conductive regions after step (a); and (c) determining a relationship between the first position and the second position based on a presence or absence of the second position within a predetermined region around the first position as a center, if the first position and the second position are detected in step (a) and step (b), respectively.

According to one aspect of the present invention, a touchscreen panel includes a first electrode substrate having a first conductive film formed on a first substrate, the first conductive film being divided into a plurality of conductive regions; a second electrode substrate having a second conductive film formed on a second substrate, the second conductive film facing toward the first conductive film; and an electrode provided along four sides of the second conductive film to generate an electric potential distribution therein; and a driver circuit configured to drive the touchscreen panel, the driver circuit including a process part configured to prolong an outputting of a signal indicating a presence of a contact with the touchscreen panel in the conductive regions for a predetermined time in response to switching of the presence to an absence of the contact in the conductive regions.

According to one aspect of the present invention, a touchscreen panel includes a first electrode substrate having a first conductive film formed on a first substrate, the first conductive film being divided into a plurality of conductive regions; a second electrode substrate having a second conductive film formed on a second substrate, the second conductive film facing toward the first conductive film; and an electrode provided along four sides of the second conductive film to generate an electric potential distribution therein; and a driver circuit configured to drive the touchscreen panel, the driver circuit including a process part configured to calculate an average of coordinates of two positions of a contact with the touchscreen panel in an adjacent two of the conductive regions and to determine the average as coordinates of a position of the contact if the touchscreen panel is contacted in the adjacent two of the conductive regions.

According to one aspect of the present invention, an electronic apparatus includes a touchscreen panel including a first electrode substrate having a first conductive film formed on a first substrate, the first conductive film being divided into a plurality of conductive regions; a second electrode substrate having a second conductive film formed on a second substrate, the second conductive film facing toward the first conductive film; and an electrode provided along four sides of the second conductive film to generate an electric potential distribution therein; and a driver circuit configured to drive the touchscreen panel, the driver circuit including a process part configured to prolong an outputting of a signal indicating a presence of a contact with the touchscreen panel in the conductive regions for a predetermined time in response to switching of the presence to an absence of the contact in the conductive regions.

According to one aspect of the present invention, an electronic apparatus includes a touchscreen panel including a first electrode substrate having a first conductive film formed on a first substrate, the first conductive film being divided into a plurality of conductive regions; a second electrode substrate having a second conductive film formed on a second substrate, the second conductive film facing toward the first conductive film; and an electrode provided along four sides of the second conductive film to generate an electric potential distribution therein; and a driver circuit configured to drive the touchscreen panel, the driver circuit including a process part configured to calculate an average of coordinates of two positions of a contact with the touchscreen panel in an adjacent two of the conductive regions and to determine the average as coordinates of a position of the contact if the touchscreen panel is contacted in the adjacent two of the conductive regions.

The object and advantages of the embodiments will be realized and attained by means of the elements and combinations particularly pointed out in the claims.

It is to be understood that both the foregoing general description and the following detailed description are exemplary and explanatory and not restrictive of the invention as claimed.

BRIEF DESCRIPTION OF THE DRAWINGS

Other objects, features and advantages of the present invention will become more apparent from the following detailed description when read in conjunction with the accompanying drawings, in which:

FIG. 17 is a diagram illustrating a configuration of the touchscreen panel according to the second embodiment of the present invention;

FIGS. 25A and 25B are diagrams illustrating the position detecting method for a touchscreen panel according to the third embodiment of the present invention;

DETAILED DESCRIPTION OF THE PREFERRED EMBODIMENTS

According to the (five-wire-type) touchscreen panel 200 described above with reference to FIG. 1 through FIG. 3B, it is possible to detect a contact position at one point. However, it is not possible to detect a position if contact is made simultaneously at multiple points.

Figure 1:
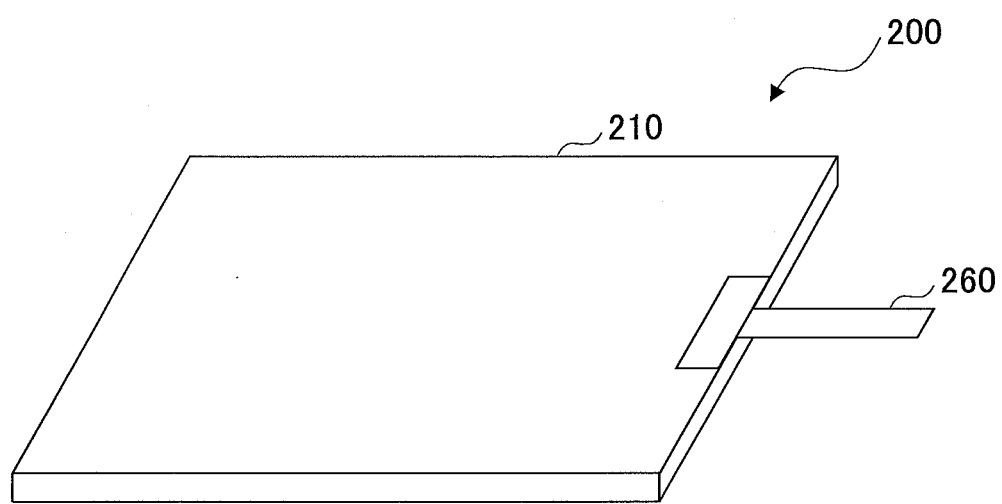
FIG. 1 is a perspective view of a five-wire type of touchscreen panel.
Figure 2:
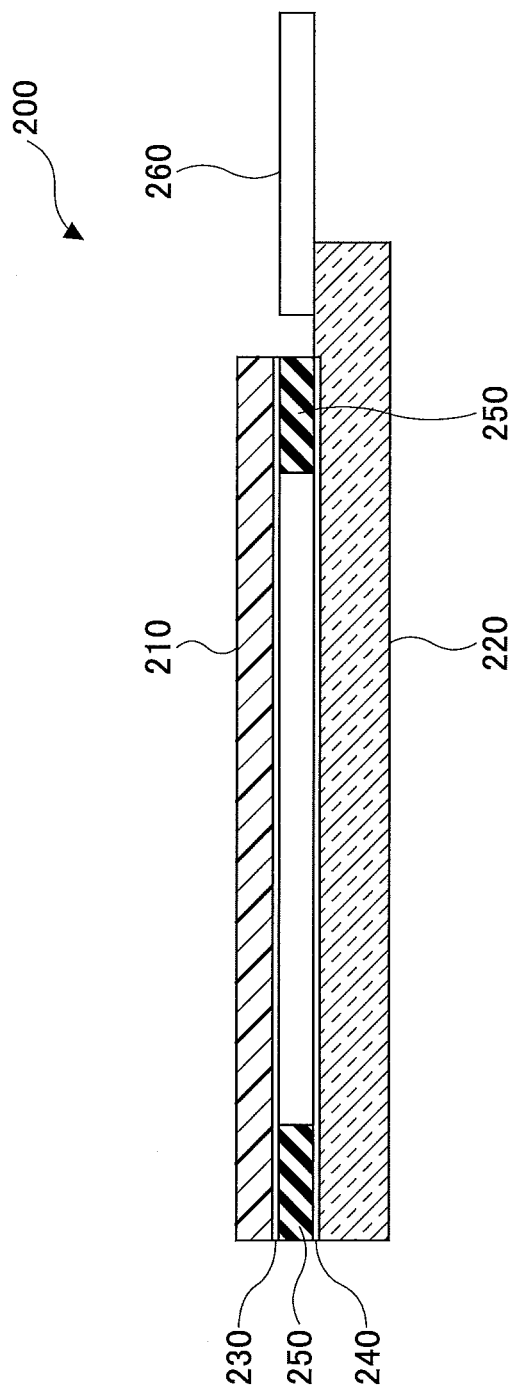
FIG. 2 is a schematic cross-sectional view of the five-wire type of touchscreen panel.
Figure 3B:
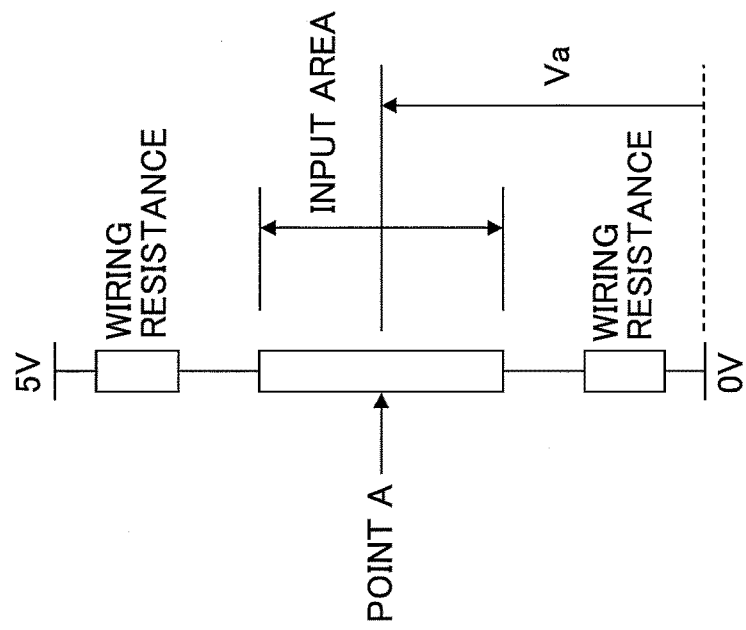
FIGS. 3A and 3B are diagrams illustrating a method of detecting coordinates in the five-wire type of touchscreen panel.
Figure 3A:
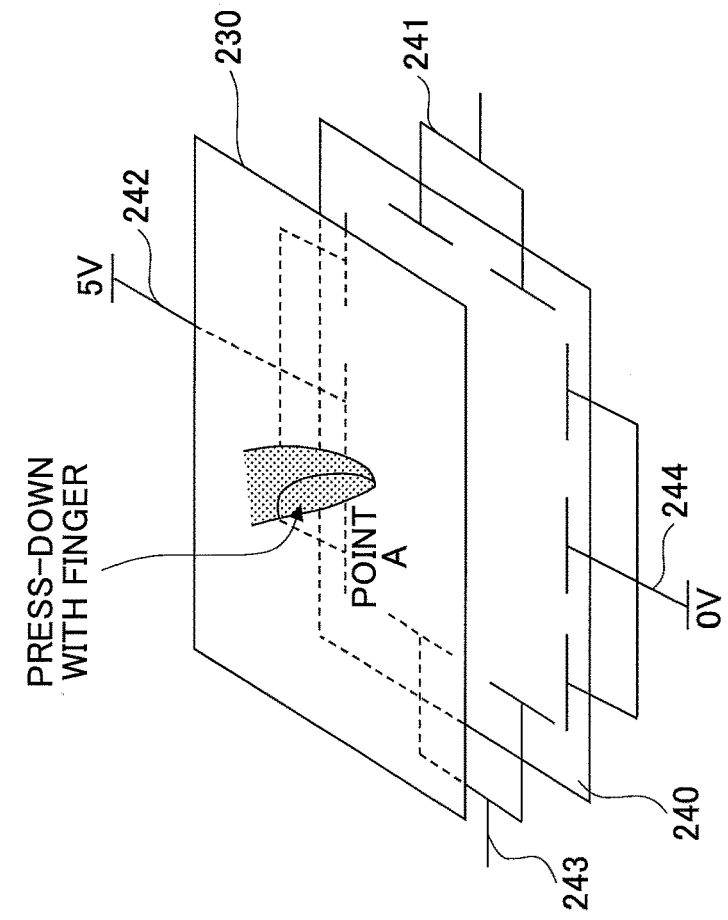
Figure 4B:
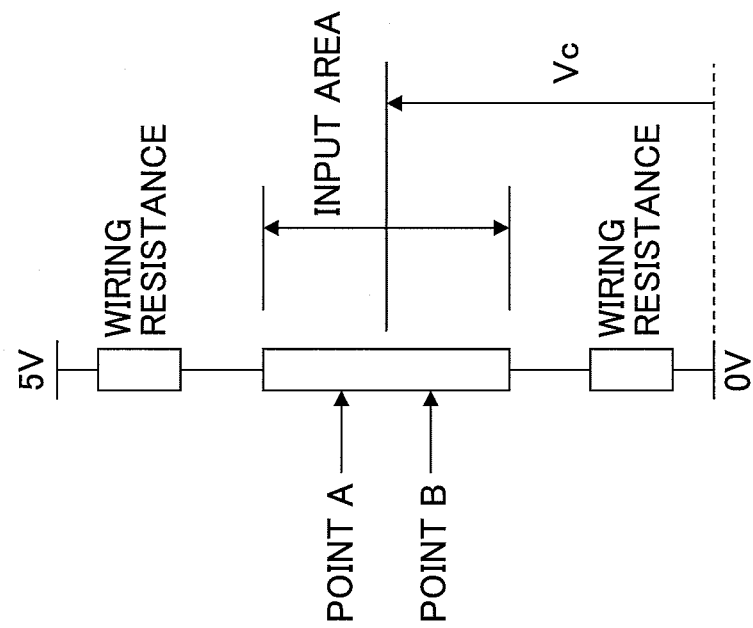
FIGS. 4A and 4B are diagrams illustrating the method of detecting coordinates in the five-wire type of touchscreen panel.
Figure 4A:
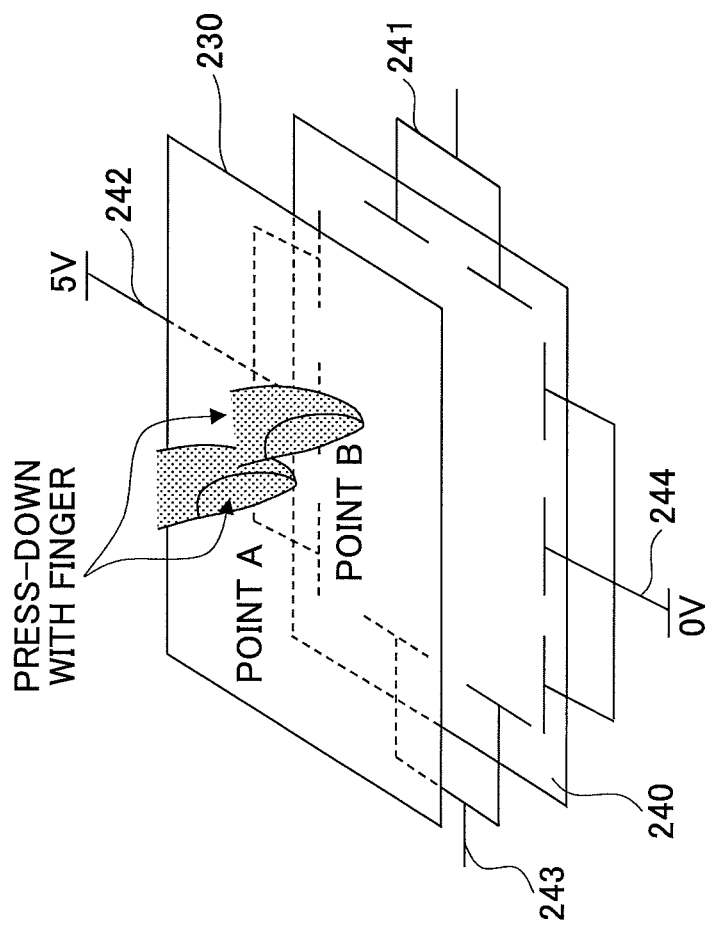

That is, as illustrated in FIG. 4A, with voltage being applied alternately in the X-axis and the Y-axis directions with the electrodes 241, 242, 243, and 244 provided on the four corresponding sides of the transparent conductive film 240, if the transparent conductive film 230 and the transparent conductive film 240 come into contact with each other at two contact points (positions) A and B, a coordinate position at the midpoint between points A and B, which position has not been pressed, is detected. This is because only one electric potential Vc is detected through the transparent conductive film 230 so that it is determined that the contact position is one point although the transparent conductive films 230 and 240 come into contact at two contact points (positions) A and B, for the position detecting method is based on electric potential detection.

According to one aspect of the present invention, a position detecting method for a touchscreen panel, a touchscreen panel, and an electronic apparatus are provided that can detect each contact position even when contact is made simultaneously at multiple contact positions and can perform position detection even when the contact position moves.

A description is given below, with reference to the accompanying drawings, of embodiments of the present invention.

[a] First Embodiment

A description is given of a touchscreen panel according to a first embodiment of the present invention.

Figure 5:
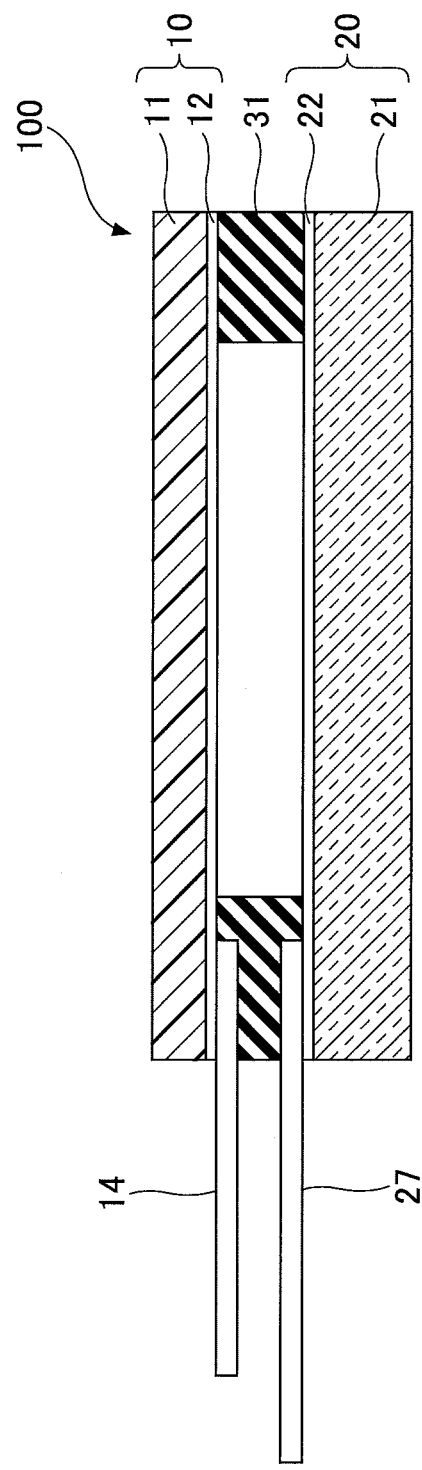
FIG. 5 is a cross-sectional view of a touchscreen panel according to a first embodiment of the present invention.

FIG. 5 is a cross-sectional view of a touchscreen panel 100 according to the first embodiment of the present invention.

Figure 6:
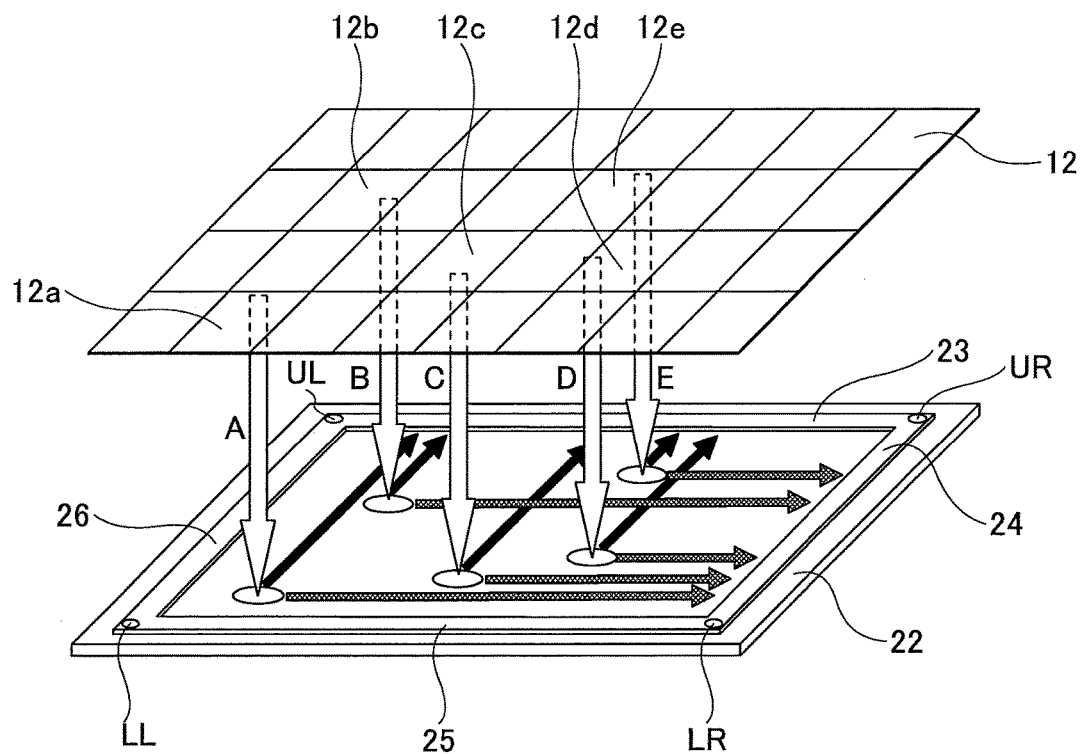
FIG. 6 is an exploded perspective view of part of the touchscreen panel according to the first embodiment of the present invention.

FIG. 6 is an exploded perspective view of part of the touchscreen panel 100.

Referring to FIG. 5 and FIG. 6, the touchscreen panel 100 according to this embodiment includes a substantially rectangular upper electrode substrate 10 and a lower electrode substrate 20 substantially equal in shape to the upper electrode substrate 10.

Figure 7:
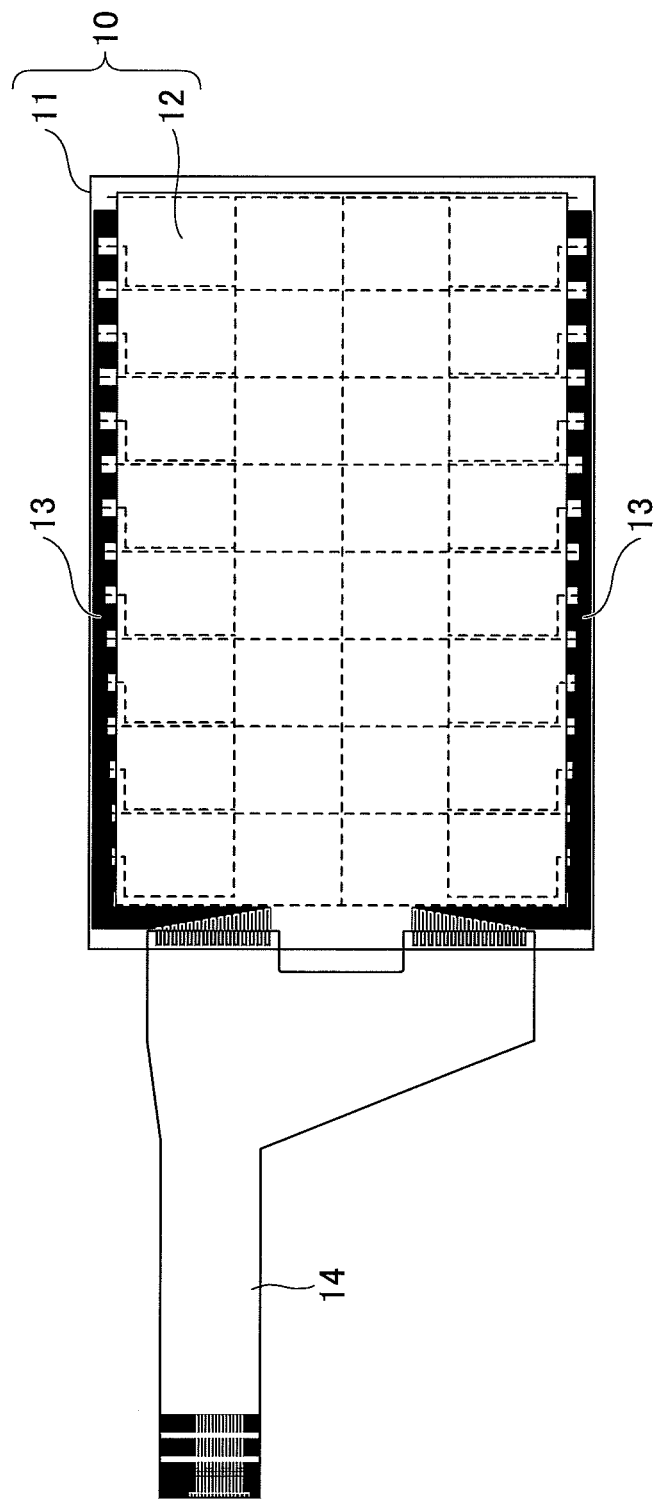
FIG. 7 is a plan view of an upper electrode substrate of the touchscreen panel, illustrating a structure of the upper electrode substrate, according to the first embodiment of the present invention.

FIG. 7 is a plan view of the upper electrode substrate 10, illustrating its structure.

Figure 8:
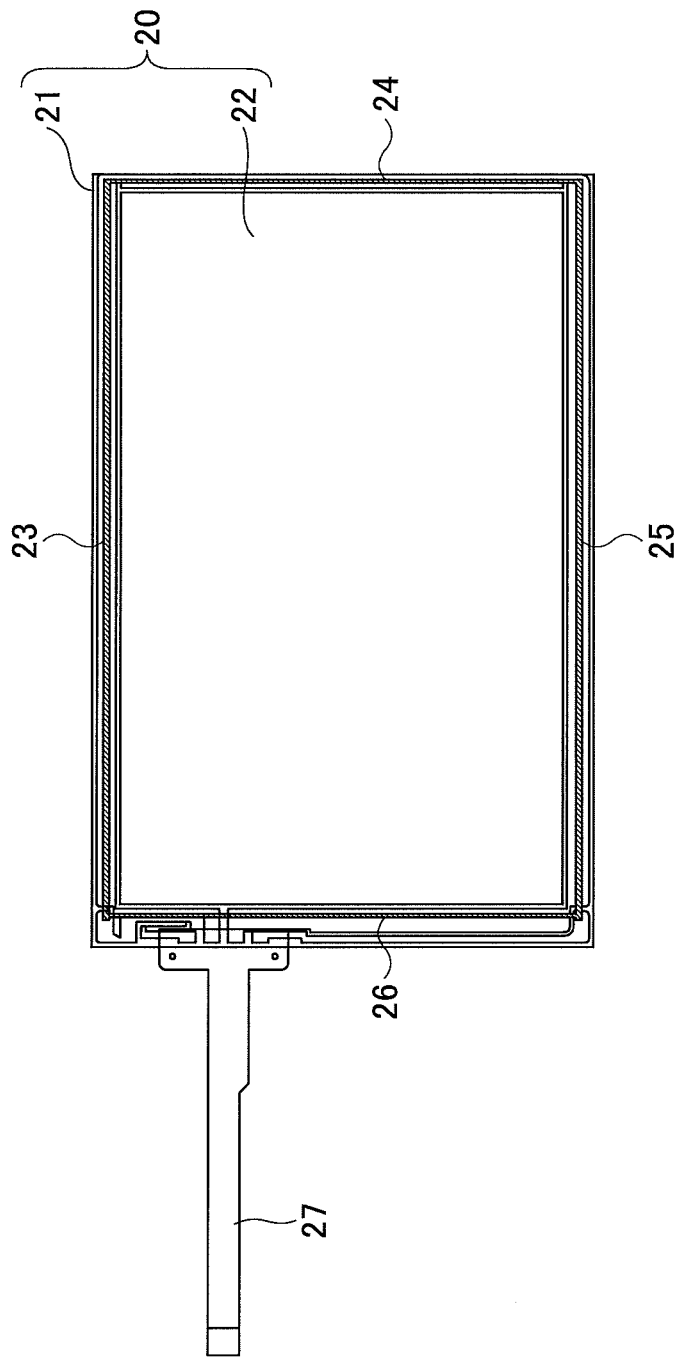
FIG. 8 is a plan view of a lower electrode substrate of the touchscreen panel, illustrating a structure of the lower electrode substrate, according to the first embodiment of the present invention.

FIG. 8 is a plan view of the lower electrode substrate 20, illustrating its structure.

Referring also to FIG. 7 and FIG. 8, the upper electrode substrate 10 includes a film 11 and a transparent conductive film (layer) 12 formed on one side (surface) of the film 11. The lower electrode substrate 20 includes a glass substrate 21 and a transparent conductive film (layer) 22 formed on one side (surface) of the glass substrate 21.

The upper electrode substrate 10 and the lower electrode substrate 20 are joined to each other through a spacer 31 using an adhesive agent or double-sided tape so that the transparent conductive film 12 in the upper electrode substrate 10 and the transparent conductive film 22 in the lower electrode substrate 20 face each other.

The transparent conductive film 12 may be divided (segmented) into m conductive regions along a shorter side thereof (or vertical direction in FIG. 7), and may be divided (segmented) into n conductive regions along a longer side thereof (or horizontal direction in FIG. 7), where m and n are natural numbers greater than or equal to 2 and m may be equal to or different from n. By way of example, in FIG. 7, the transparent conductive film 12 is divided widthwise and lengthwise (vertically and laterally in FIG. 7) into four and eight units, respectively, and thus into 32 conductive regions in total. The transparent conductive film 12 is divided into the 32 conductive regions by removing the conductive film 12 in between the divided regions. As a result, the divided regions are electrically insulated from each other.

The individual divided regions of the transparent conductive film 12 are connected to the extension electrodes of an extension electrode part 13 (FIG. 7) provided at both ends of the upper electrode substrate 10 in the widthwise directions, to be extended in the peripheral part of the upper electrode substrate 10 to be connected to a flexible substrate 14 at one end of the upper electrode substrate in the lengthwise directions.

Referring to FIG. 6, four electrode portions 23, 24, 25, and 26 forming a rectangular frame (or ring) shaped electrode (FIG. 8), which is a Ag or Ag—C resistive film, are provided on the transparent conductive film 22 along the four sides of the lower electrode substrate 20. The rectangular frame shaped electrode formed by the four electrode portions 23, 24, 25 and 26 has electrode parts UR, UL, LR, and LL provided at the upper right corner, the upper left corner, the lower right corner, and the lower left corner, respectively, of the rectangular frame shape. The four electrode parts UR, UL, LR, and LL are drawn out by extension lines from the peripheral part of the lower electrode substrate 20 to be connected to a flexible substrate 27 at one end of the lower electrode substrate 20 in the lengthwise directions as illustrated in FIG. 8.

The flexible substrate 14 and the flexible substrate 27 are connected to a control circuit (not graphically illustrated) and further to a host computer (not graphically illustrated). Examples of the material of the transparent conductive film 12 and the transparent conductive film 22 include ITO (Indium Tin Oxide), Al-doped ZnO (zinc oxide), Ga-doped ZnO, and Sb-doped $SnO_2$.

Further, examples of the material of the film 11 include PET (polyethylene terephthalate), PC (polycarbonate), and resin materials transparent in the visible range. Further, the glass substrate 21 may be replaced with a resin substrate.

According to the touchscreen panel 100 of this embodiment, in response to the upper electrode substrate 10 being pressed with a finger or the like, the transparent conductive film 12 in the upper electrode substrate 10 and the transparent conductive film 22 in the lower electrode substrate 20 come into contact with each other. Then, voltage at the contact position is detected so that the contact position of the upper electrode substrate 10 and the lower electrode substrate 20, that is, the point at which the upper electrode substrate 10 has been pressed with a finger is located. Specifically, in the upper electrode substrate 10, the individual divided regions of the transparent conductive film 12 are scanned by time division (scanned sequentially), so that it is possible to locate or identify a conductive region including the contact position based on contact timing. In the touchscreen panel 100, voltage is applied to the four electrode parts UR, UL, LR, and LL of the rectangular frame shaped electrode formed by the electrode portions 23, 24, 25, and 26 provided on the four sides of the transparent conductive film 22 in the lower electrode substrate 20, so that a potential difference (distribution) is caused alternately in the X-axis (vertical) and the Y-axis (lateral) directions in the lower electrode substrate 20.

Thus, the transparent conductive film 12 is divided to form conductive regions in the upper electrode substrate 10. As a result, even when the upper electrode substrate 10 and the lower electrode substrate 20 come into contact with each other at multiple positions, it is possible to locate or determine the contact positions on a divided conductive region basis. Accordingly, it is possible to detect the individual contact positions independently of each other.

That is, even if the transparent conductive film 12 in the upper electrode substrate 10 and the transparent conductive film 22 in the lower electrode substrate 20 come into contact at five positions (points) indicated by arrows A, B, C, D, and E as illustrated in FIG. 6, the contact positions are in different divided regions of the transparent conductive film 12. Accordingly, it is possible to detect the contact positions independently of one another.

Specifically, when the contact position of the upper electrode substrate 10 and the lower electrode substrate 20 is the position indicated by arrow A, the upper electrode substrate 10 and the lower electrode substrate 20 are in contact with each other in a conductive region 12a of the transparent conductive film 12.

When the contact position of the upper electrode substrate 10 and the lower electrode substrate 20 is the position indicated by arrow B, the upper electrode substrate 10 and the lower electrode substrate 20 are in contact with each other in a conductive region 12b of the transparent conductive film 12.

When the contact position of the upper electrode substrate 10 and the lower electrode substrate 20 is the position indicated by arrow C, the upper electrode substrate 10 and the lower electrode substrate 20 are in contact with each other in a conductive region 12c of the transparent conductive film 12.

When the contact position of the upper electrode substrate 10 and the lower electrode substrate 20 is the position indicated by arrow D, the upper electrode substrate 10 and the lower electrode substrate 20 are in contact with each other in a conductive region 12d of the transparent conductive film 12.

When the contact position of the upper electrode substrate 10 and the lower electrode substrate 20 is the position indicated by arrow E, the upper electrode substrate 10 and the lower electrode substrate 20 are in contact with each other in a conductive region 12e of the transparent conductive film 12.

The conductive regions 12a through 12e of the transparent conductive film 12 are different regions insulated from one another. Accordingly, it is possible to detect the contact positions independently of one another. Therefore, even when the upper electrode substrate 10 and the lower electrode substrate 20 come into contact with each other at five positions, it is possible to locate or identify the individual contact positions.

Thus, even when the transparent conductive film 12 and the transparent conductive film 22 come into contact with each other at multiple positions (points), it is possible to determine the contacted conductive regions. Further, by detecting an electric potential distribution in the transparent conductive film 22, it is possible to detect a coordinate position with more accuracy. Further, when the contact position of the transparent conductive film 12 and the transparent conductive film 22 moves, it is possible to recognize the movement of the contact position and to detect the coordinates of a position to which the contact position moves by detecting an electric potential distribution in the transparent conductive film 22.

In the transparent conductive film 12, the individual conductive regions are formed by removing (portions of) the transparent conductive film 12 along the perimeter of each of the individual conductive regions. This makes it possible to keep adjacent conductive regions insulated from each other.

By way of example, the transparent conductive film 12 may be removed (from along the perimeter of each of the individual conductive regions) by: (a) exposing regions to be removed of the transparent conductive film 12 to laser light and removing the regions exposed to the laser light by heat or abrasion; (b) applying photoresist on the transparent conductive film 12, forming a resist pattern on regions to become conductive regions by performing exposure and development with an exposure apparatus, and removing regions of the transparent conductive film 12 on which the resist pattern is not formed by performing dry etching or wet etching; or (c) printing etching paste on regions to be removed of the transparent conductive film 12 and removing the regions. Preferably, the transparent conductive film 12 is removed by exposure to laser light.

Preferably, the portions of the transparent conductive film 12 removed to form conductive regions are less than or equal to 1 mm in width. In touchscreen panels, an increase in the width of the removed portions of the transparent conductive film results in an increase in the area where detection is not performable, thus preventing touchscreen panels from fully functioning. Touchscreen panels are supposed to be contacted by a finger or a pen, and the pen point is approximately 0.8 mm in radius. Accordingly, if the regions (portions) to be removed of the transparent conductive film 12 are less than or equal to 1 mm in width, it is believed that the touchscreen panel 100 is not prevented from implementing its function. According to this embodiment, the regions to be removed of the transparent conductive film 12 may be approximately 100 μm in width in order to improve the visibility and the function of the touchscreen panel 100.

A description is given below of a position detecting method for a touchscreen panel and a touchscreen panel according to this embodiment.

Figure 9:
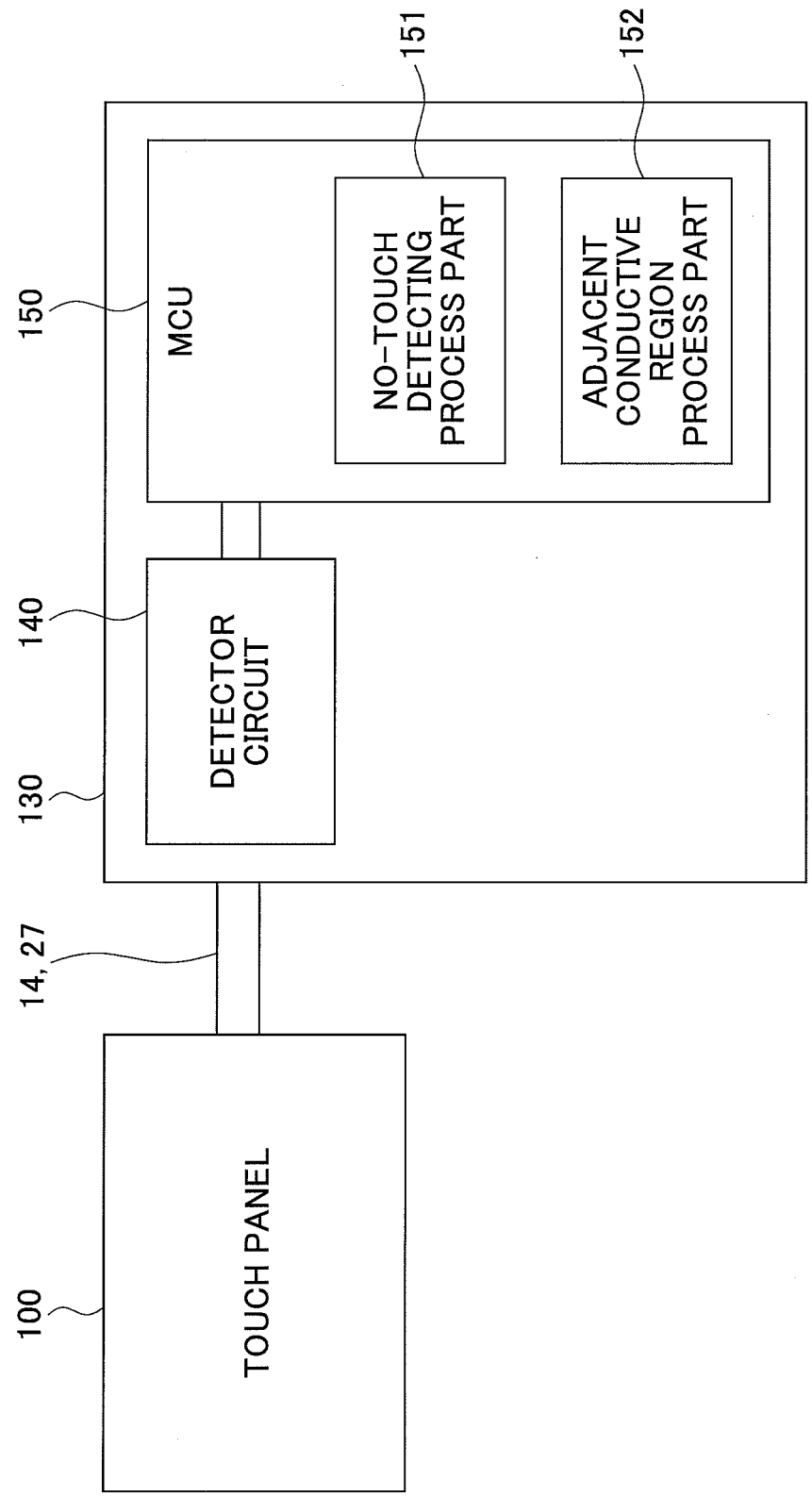
FIG. 9 is a block diagram illustrating a touchscreen panel according to the first embodiment of the present invention.

FIG. 9 is a block diagram illustrating a touchscreen panel according to the first embodiment of the present invention.

Referring to FIG. 9, the touchscreen panel 100 illustrated in FIG. 5 according to this embodiment is connected to a driver circuit 130 through the flexible substrates 14 and 27. In the case illustrated in FIG. 9, the touchscreen panel 100 and the driver circuit 130 may be implemented as a touchscreen panel unit, which is an example of an electronic apparatus. The driver circuit 130 may be included in or provided external to the touchscreen panel 100. The touchscreen panel 100 may be connected to a host computer (not graphically illustrated) through the driver circuit 130. The driver circuit 130 applies voltage to the touchscreen panel 100 and calculates the position coordinates of a contact position in the touchscreen panel 100 based on detected voltage values. The driver circuit 130 includes a detector circuit 140 configured to detect voltage values and a microcontroller unit (MCU) 150. The MCU 150 includes a NO-TOUCH detecting process part 151 and an adjacent conductive region processing part 152.

The four electrode parts UR, UL, LR, and LL of the rectangular frame shaped electrode (FIG. 6) are connected to the detector circuit 140 so that the detector circuit 140 controls voltage applied to the four electrode parts UR, UL, LR, and LL. The detector circuit 140 generates a potential distribution alternately in the X-axis and the Y-axis directions based on drive signals input from the MCU 150. The detector circuit 140 is connected to each of the divided regions of the transparent conductive film 12. The detector circuit 140 performs scanning on a line-by-line basis, and detects signals representing the potential distributions of the individual regions. This scanning is performed based on region selecting signals input from the MCU 150. The region selecting signals are for sequentially selecting the divided regions in each line on a row-by-row basis. The lines may be simultaneously subjected to this region selecting based on these region selecting signals. The detector circuit 140 outputs signals that represent the potential distributions of the corresponding lines to the MCU 150.

Next, a description is given of a NO-TOUCH detecting process.

As described above, the touchscreen panel 100 of this embodiment is divided widthwise and lengthwise (vertically and laterally) into four and eight units, respectively, so as to be capable of detecting multiple contact positions.

Figure 10:
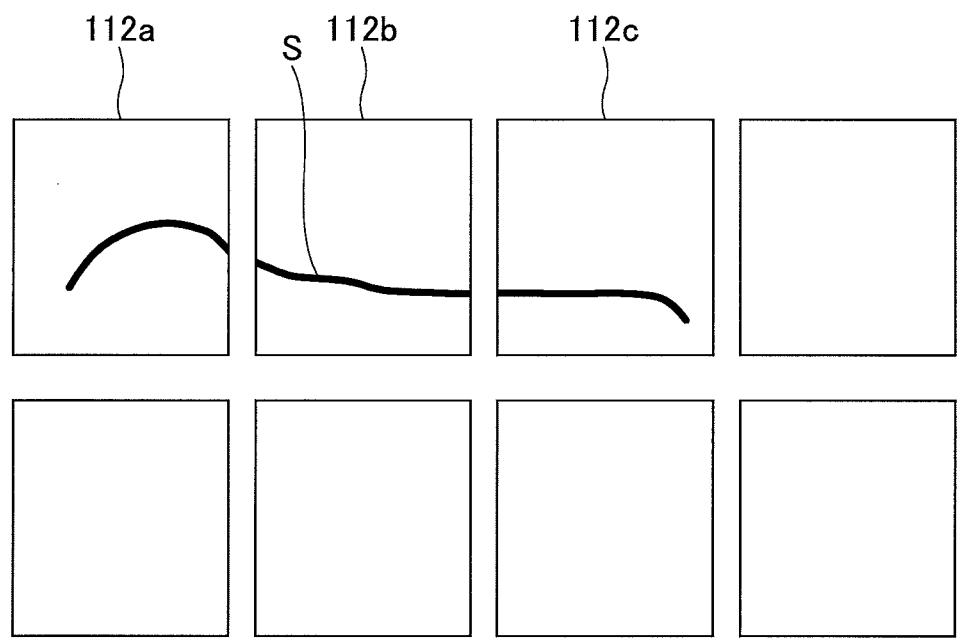
FIG. 10 is a diagram illustrating a NO-TOUCH detecting process according to the first embodiment of the present invention.

Accordingly, if a fingertip is moved on and over multiple conductive regions 112a, 112b, and 112c at the surface of the touchscreen panel 100 as illustrated in FIG. 10, the track of the movement of the fingertip, which would be continuous if the conductive regions 112a through 112c were continuous, is detected as a track S broken between each adjacent two of the conductive regions 112a through 112c because the conductive regions 112a through 112c are discontinuous (separated).

Specifically, the track S is broken between the conductive region 112a and the conductive region 112b and between the conductive region 112b and the conductive region 112c. Therefore, if the information were output as it is, the track would be broken between conductive regions, and be thus different from the track of the actual movement of the fingertip.

According to this embodiment, it is possible to output a track that is continuous (not broken) between conductive regions by performing NO-TOUCH (state) detecting in the NO-TOUCH detecting process part 151 in the MCU 150.

Figure 11:
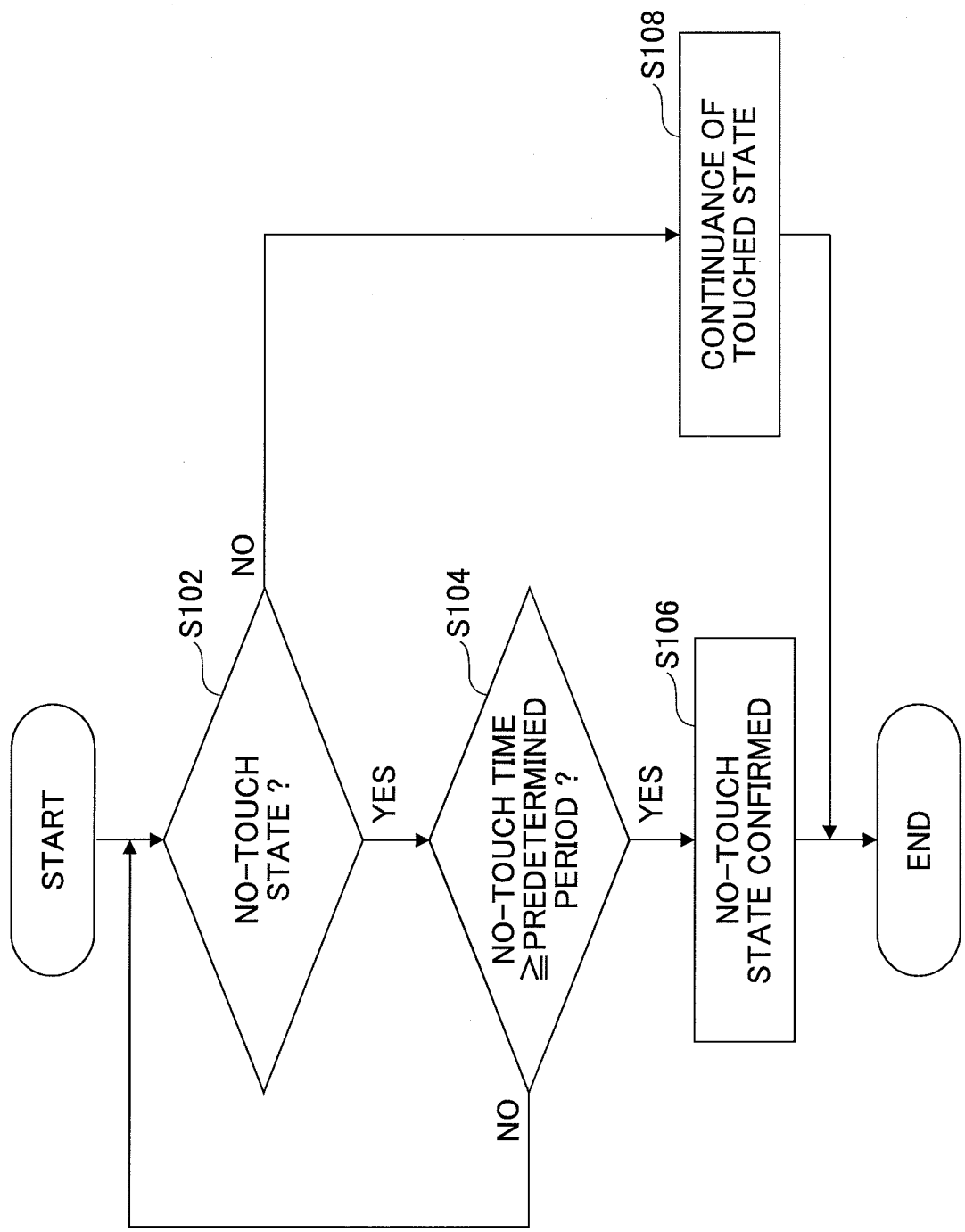
FIG. 11 is a flowchart of the NO-TOUCH detecting process according to the first embodiment of the present invention.

A description is given of this NO-TOUCH detecting process based on FIG. 11.

FIG. 11 is a flowchart of the NO-TOUCH detecting process according to the first embodiment.

First, in step S102 of FIG. 11, it is determined whether the state is NO-TOUCH. Specifically, it is determined whether information to the effect that a fingertip or an object such as a pen point is in contact with the touchscreen panel 100 has been transmitted to the MCU 150 of the driver circuit 130.

If a fingertip or the like is in contact with a conductive region of the transparent conductive film 12 of the touchscreen panel 100, for example, the conductive region 112a, 112b, or 112c (FIG. 10), information to the effect that a fingertip or the like is in contact with the touchscreen panel 100, that is, information indicating that the touchscreen panel 100 is in a TOUCHED state (contacted by a fingertip or the like), is transmitted to the MCU 150 of the driver circuit 130.

On the other hand, if a fingertip or the like is in contact with the touchscreen panel 100 between conductive regions, for example, between the conductive region 112a and the conductive region 112b or between the conductive region 112b and the conductive region 112c, information to the effect that a fingertip or the like is not in contact with the touchscreen panel 100, that is, information indicating that the touchscreen panel 100 is in a NO-TOUCH state (out of contact with a fingertip or the like), is transmitted to the MCU 150 of the driver circuit 130. Further, in the case where no fingertip or the like is actually in contact with the touchscreen panel 100 as well, information indicating that the touchscreen panel 100 is in a NO-TOUCH state is transmitted to the MCU 150 of the driver circuit 130.

Thus, the MCU 150 of the driver circuit 130 is also informed that the touchscreen panel 100 is in a NO-TOUCH state if the position of contact by a fingertip or the like is in between conductive regions. If it is determined that the state is NO-TOUCH (YES in step S102), the process proceeds to step S104. On the other hand, if it is determined that the state is not NO-TOUCH (NO in step S102), that is, for example, if it is determined that a fingertip or the like is in contact with the touchscreen panel 100 in conductive regions, the process proceeds to step S108.

Next, in step S104, it is determined whether the NO-TOUCH time is longer than or equal to a predetermined period of time. (That is, it is determined whether the NO-TOUCH state has continued for a predetermined period of time or longer.) For example, a time that has passed after entry into the NO-TOUCH state is measured as the NO-TOUCH time with a timer (not graphically illustrated) provided in the NO-TOUCH detecting process part 151, and it is determined whether this time is longer than or equal to a predetermined period of time. That is, it is highly likely that a fingertip or the like is in touch with the touchscreen panel 100 in between conductive regions if the NO-TOUCH time is shorter than a predetermined period of time, and it is unlikely that a fingertip or the like is in touch with the touchscreen panel 100 in between conductive regions and it is highly likely that the fingertip or the like is actually separated from the touchscreen panel 100 if the NO-TOUCH time is longer than or equal to a predetermined period of time. Accordingly, the determination is performed from this viewpoint.

The predetermined period of time may be set (determined) as desired based on the interval between conductive regions or the use condition of the touchscreen panel 100. According to this embodiment, the predetermined period of time may be 20 ms to 100 ms.

If it is determined that the NO-touch time is longer than or equal to the predetermined period of time (YES in step S104), the process proceeds to step S106. On the other hand, if it is determined that the NO-TOUCH time is shorter than the predetermined period of time (NO in step S104), the process proceeds to step S102, and it is again determined whether the state is NO-TOUCH.

Next, in step S106, the NO-TOUCH state of the touchscreen panel 100 is confirmed. It has been determined in step S104 that the NO-TOUCH time is longer than or equal to the predetermined period of time. In this case, a fingertip or the like is unlikely to be present between conductive regions and is highly likely to be out of contact with the touchscreen panel 100. Accordingly, it is determined that the fingertip or the like is detached from the touchscreen panel 100, and the NO-TOUCH state of the touchscreen panel 100 is confirmed. Thereby, the NO-TOUCH detecting process ends.

On the other hand, in step S108, the TOUCHED state of the touchscreen panel 100 is confirmed. For example, the continuance of the TOUCHED state is determined, and the NO-TOUCH detecting process ends.

According to this embodiment, in order to prevent premature confirmation of a NO-TOUCH state after (detecting) an entry into the NO-TOUCH state, that is, for example, in order to prevent the track of the movement of a fingertip or the like from being interrupted between conductive regions, a signal indicating the entry into the NO-TOUCH state is generated with a delay of a predetermined period of time after detection of the entry into the NO-TOUCH state.

Figure 12:
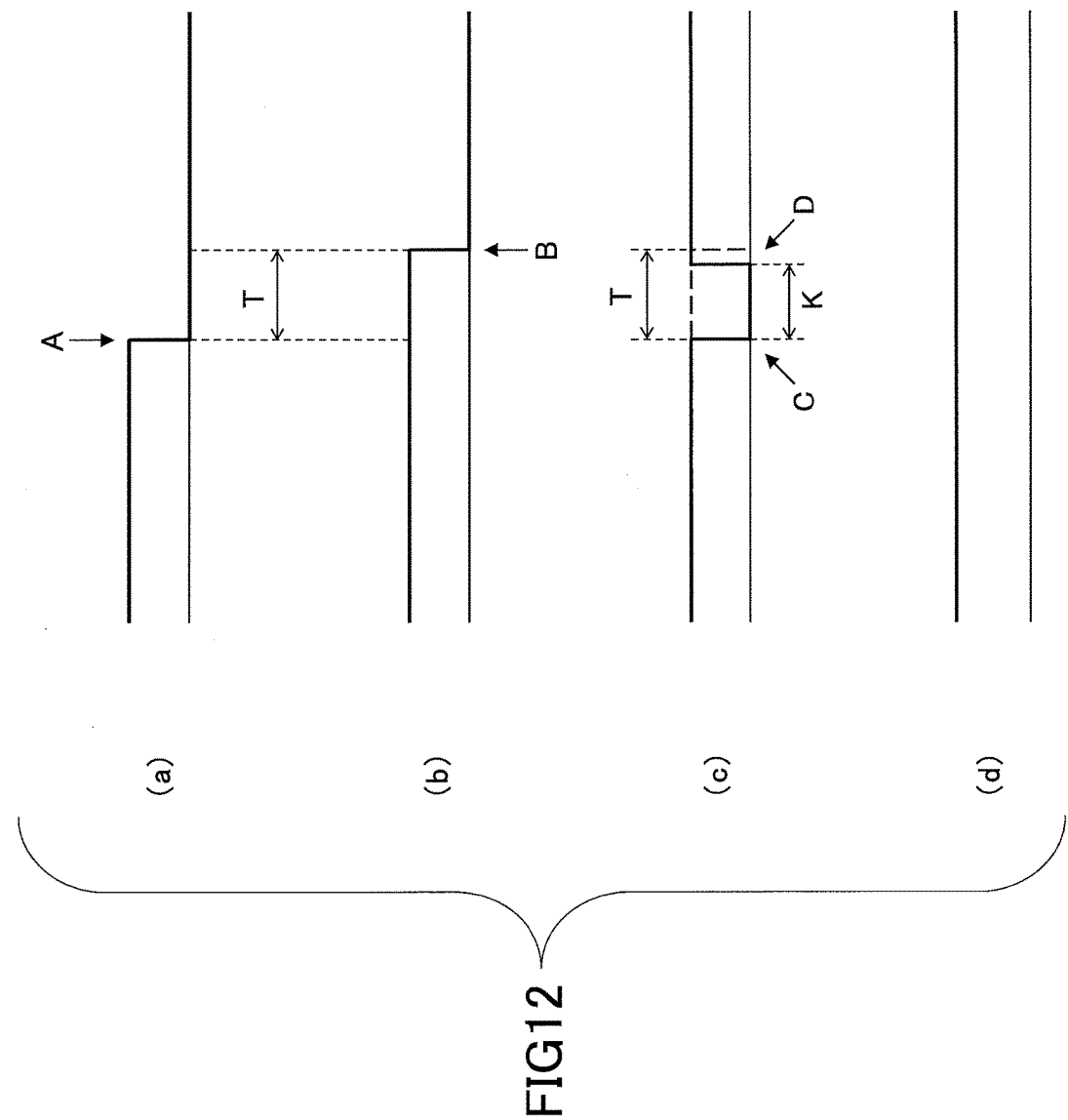
FIG. 12 is a timing chart for illustrating the NO-TOUCH detecting process according to the first embodiment of the present invention.

A description is given conceptually of this processing based on FIG. 12.

FIG. 12 is a timing chart for illustrating the NO-TOUCH detecting process according to this embodiment.

In FIG. 12, (a) indicates an actual contact and separation of a fingertip or the like. The state switches from TOUCHED to NO-TOUCH at time A as illustrated in (a) of FIG. 12, but a signal indicating the entry into the NO-TOUCH state is output at time B after passage of a delay time T after the entry into (switching to) the NO-TOUCH state as illustrated in (b) of FIG. 12. As a result, between time A and time B, a signal indicating the TOUCHED state, that is, a signal indicating that the fingertip or the like is in contact with the touchscreen panel 100, continues to be output although the fingertip or the like is out of contact with the touchscreen panel 100. This delay time T is longer than or equal to the predetermined period in step S104 of FIG. 11.

The delay time T is thus provided. Accordingly, even when a fingertip or the like is separated from the touchscreen panel 100 at time C and comes into contact with the touchscreen panel 100 at time D as illustrated in (c) of FIG. 12, a signal indicating the TOUCHED state continues to be output if an interval K between time C and time D is shorter than the delay time T. As a result, as illustrated in (d) of FIG. 12, the track of the movement of the fingertip or the like is prevented from being interrupted even when the fingertip or the like moves over multiple conductive regions.

Next, a description is given of an adjacent conductive region process according to this embodiment.

According to the touchscreen panel 100 of this embodiment, the transparent conductive film 12 is removed between conductive regions. Therefore, when a signal indicating contact at two points in adjacent conductive regions is detected, it is desirable to determine whether a fingertip or the like is in contact with the touchscreen panel 100 in two conductive regions or at one point between two conductive regions.

Figure 13:
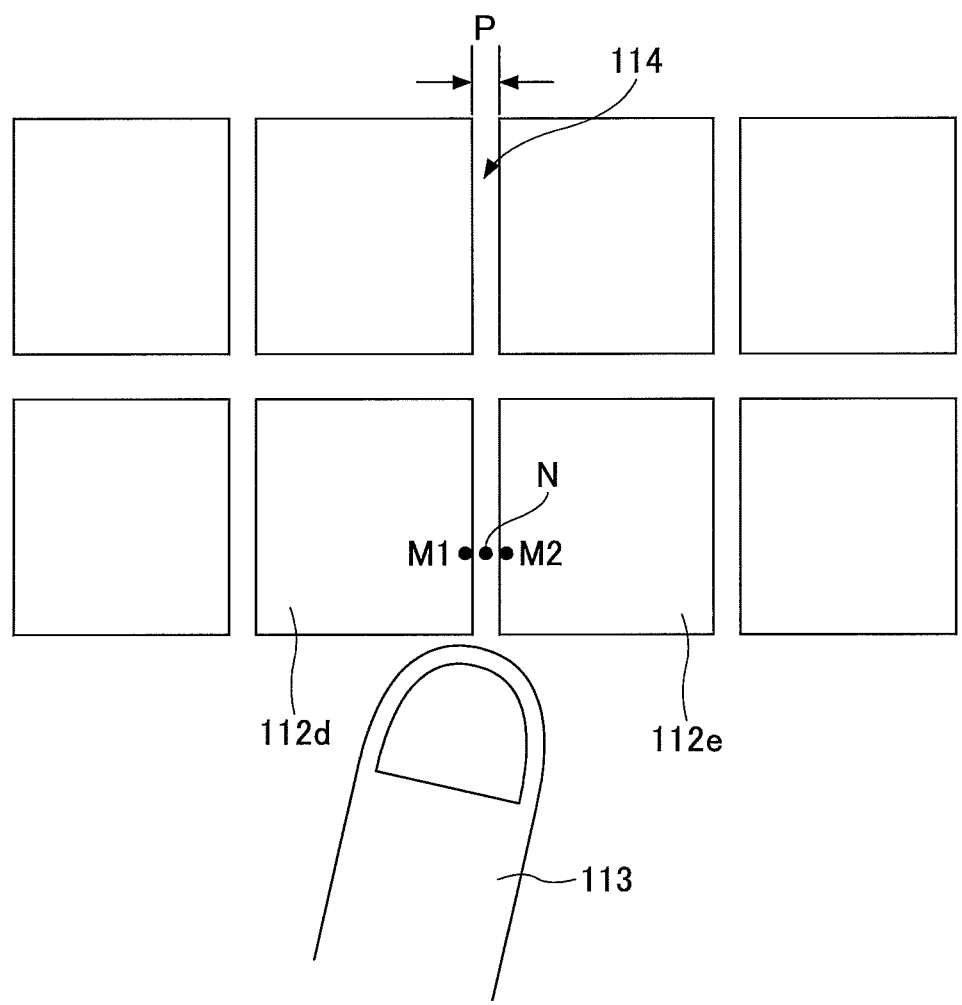
FIG. 13 is a diagram illustrating an adjacent conductive region process according to the first embodiment of the present invention.

For example, when a fingertip 113 comes into contact with the touchscreen panel 100 between a conductive region 112*e* and a conductive region 112*e*, that is, at a contact position N in a conductive film removal region 114, as illustrated in FIG. 13, information indicating that contact is made at a contact position M1 in the conductive region 112*d* and a contact position M2 in the conductive region 112*e* is transmitted.

According to this embodiment, in order to avoid determining that there are two contact positions in this case, the MCU 150 includes the adjacent conductive region process part 152 to address such a situation.

Figure 14:
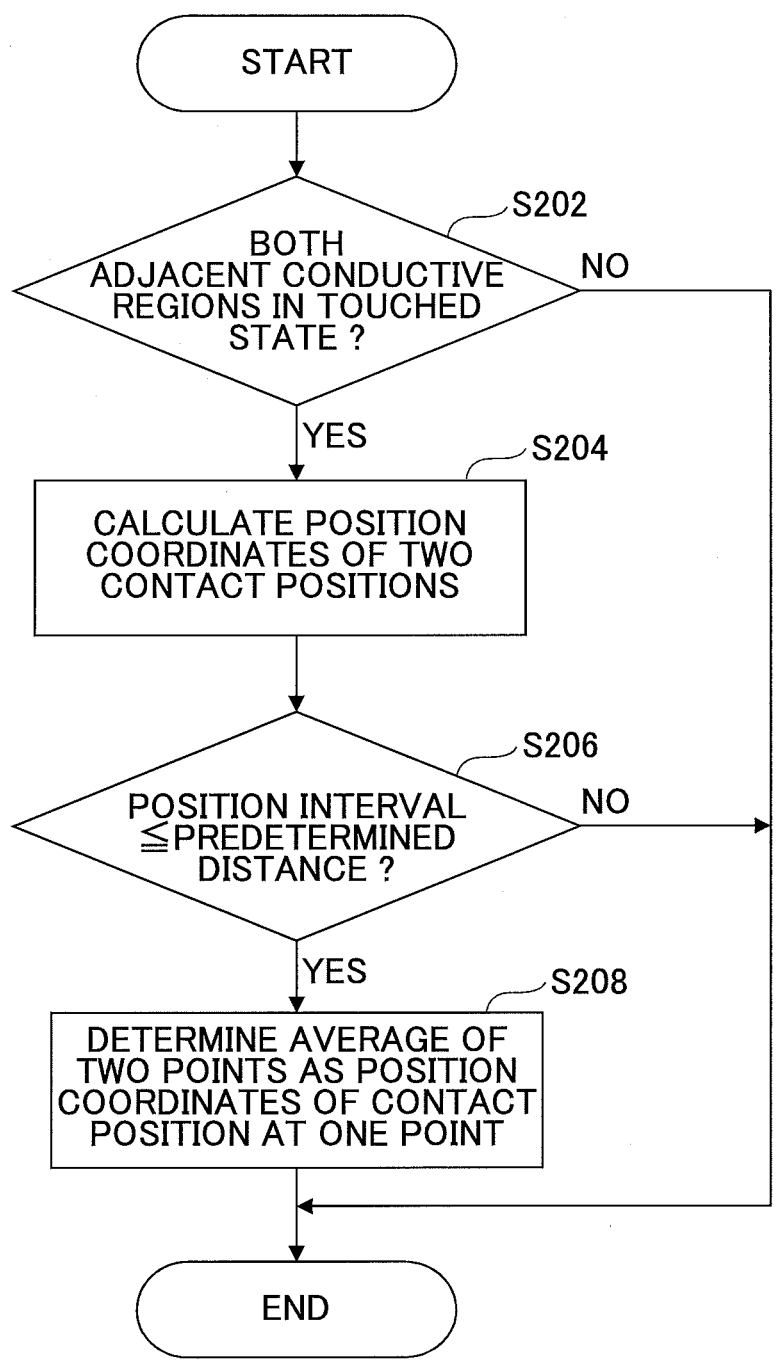
FIG. 14 is a flowchart of the adjacent conductive region process according to the first embodiment of the present invention.

A description is given of the adjacent conductive region process based on FIG. 14.

FIG. 14 is a flowchart of the adjacent conductive region process according to the first embodiment.

First, in step S202 of FIG. 14, it is determined whether both of adjacent conductive regions are in a TOUCHED state. For example, it is determined whether both of adjacent conductive regions are contacted by a fingertip or the like and are in a TOUCHED state. If both of adjacent conductive regions are in a TOUCHED state (YES in step S202), the process proceeds to step S204. On the other hand, if both of adjacent conductive regions are not in a TOUCHED state (NO in step S202), there is no substantial need for performing the adjacent conductive region process. Therefore, the adjacent conductive region process ends.

Next, in step S204, the position coordinates of the two contact positions are calculated. The touchscreen panel 100 of this embodiment has the transparent conductive film 12 divided into multiple conductive regions, in each of which the position coordinates of a contact position may be calculated. Accordingly, the position coordinates of the contact position M1 in the conductive region 112*d* and the position coordinates of the contact position M2 in the conductive region 112*e* are calculated.

Next, in step S206, it is determined whether the interval between the contact positions is less than or equal to a predetermined distance. For example, the adjacent conductive region process part 152 calculates a contact interval (distance) between the contact position M1 and the contact position M2 based on the position coordinates of the contact position M1 and the position coordinates of the contact position M2 calculated in step S204.

If the contact interval (distance) between the contact position M1 and the contact position M2 is less than or equal to a predetermined distance, it is highly likely that the contact is made at one point between the conductive region 112*d* and the conductive region 112*e*. On the other hand, if the contact interval (distance) between the contact position M1 and the contact position M2 is more than a predetermined distance, it is highly likely that contact is made at two points, that is, the contact position M1 in the conductive region 112*d* and the contact position M2 in the conductive region 112*e*. Accordingly, if it is determined that the contact interval is less than or equal to a predetermined distance (YES in step S206), the process proceeds to step S208. On the other hand, if it is determined that the contact interval is not less than or equal to a predetermined distance (NO in step S206), it is determined that contact is made at two points, and the process ends.

Next, in step S208, the average of the two points is determined as the position coordinates of the one point. For example, the adjacent conductive region process part 152 calculates the average of the position coordinates of the contact position M1 and the position coordinates of the contact position M2. The calculated average, which is a coordinate position, is output as the position coordinates of the contact position N, and the process ends.

Thus, even when contact is made at one point between adjacent conductive regions but is detected as contacting at two points, one in each of the adjacent conductive regions, it is possible to obtain the position coordinates of the one actual contact position.

The predetermined distance in step S206 is determined in accordance with a distance between conductive regions. For example, the predetermined distance is set to a value greater than or equal to the interval between conductive regions, that is, a width P (FIG. 13) of the conductive film removal region 114 where the transparent conductive film 12 is removed to form conductive regions. Further, this predetermined distance, which differs between objects that come into contact with the touchscreen panel 100, may be determined in accordance with a use environment and/or a use condition.

[b] Second Embodiment

Next, a description is given of a second embodiment according to the present invention.

This embodiment relates to a method of determining the position coordinates of a contact position in the case where the contact position moves on the touchscreen panel 100 of the first embodiment.

In the following description, the same elements as those described above are referred to by the same reference numerals.

Figure 15:
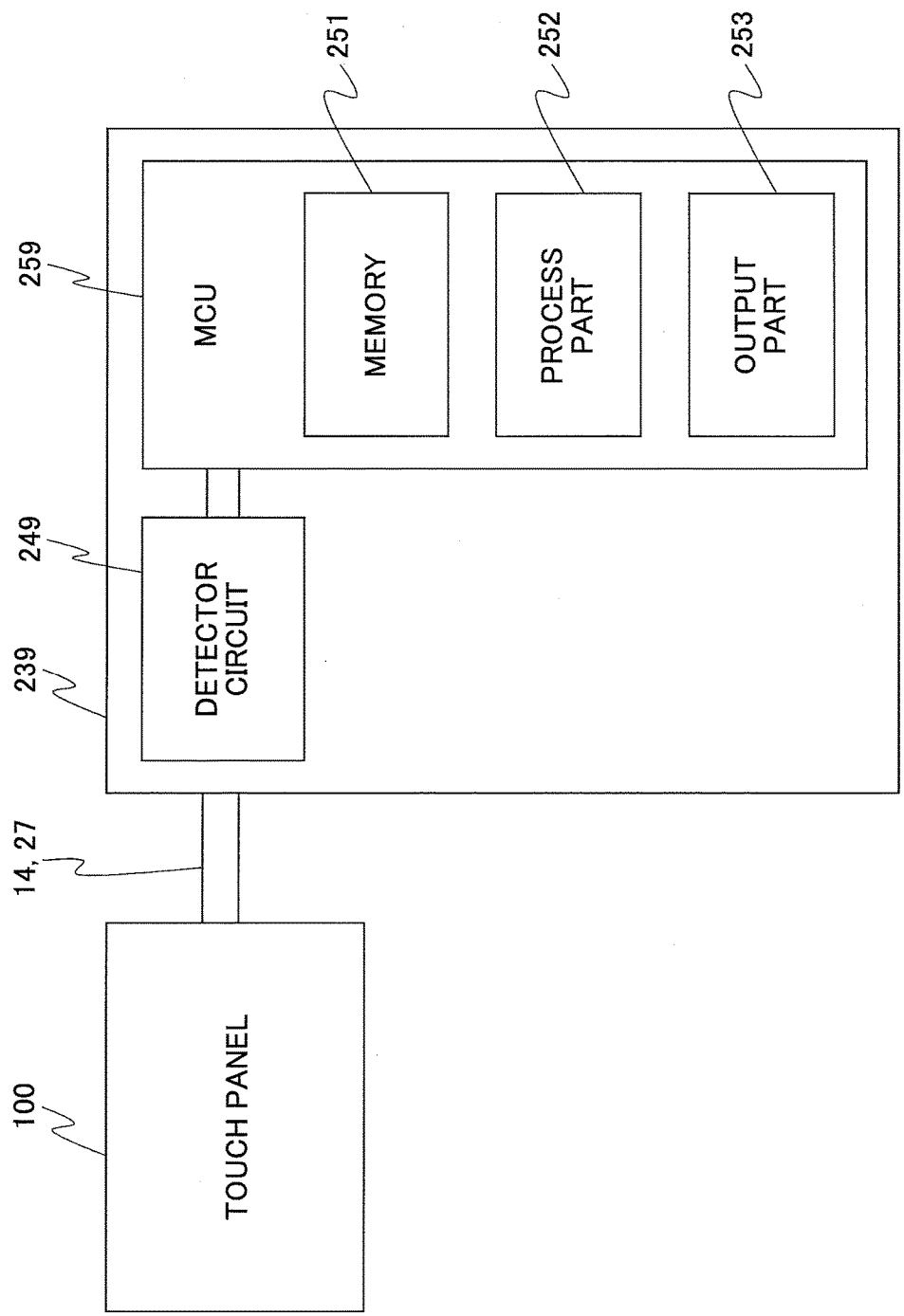
FIG. 15 is a block diagram illustrating a touchscreen panel according to a second embodiment of the present invention.

FIG. 15 is a block diagram illustrating a touchscreen panel according to the second embodiment of the present invention.

Referring to FIG. 15, the touchscreen panel 100 is connected to a driver circuit 239 through the flexible substrates 14 and 27. In the case illustrated in FIG. 15, the touchscreen panel 100 and the driver circuit 239 may be implemented as a touchscreen panel unit, which is an example of an electronic apparatus. The driver circuit 239 may be included in or provided external to the touchscreen panel 100. The touchscreen panel 100 may be connected to a host computer (not graphically illustrated) through the driver circuit 239. The driver circuit 239 applies voltage to the touchscreen panel 100 and calculates the position coordinates of a contact position in the touchscreen panel 100 based on detected voltage values. The driver circuit 239 includes a detector circuit 249 configured to detect voltage values and a microcontroller unit (MCU) 259. The MCU 259 includes a memory 251, a process part 252, and an output part 253. The MCU 259 may be replaced with the MCU 150 of the first embodiment additionally having the above-described function. The detector circuit 249 may have the same configuration as the detector circuit 150 of FIG. 9.

Figure 16:
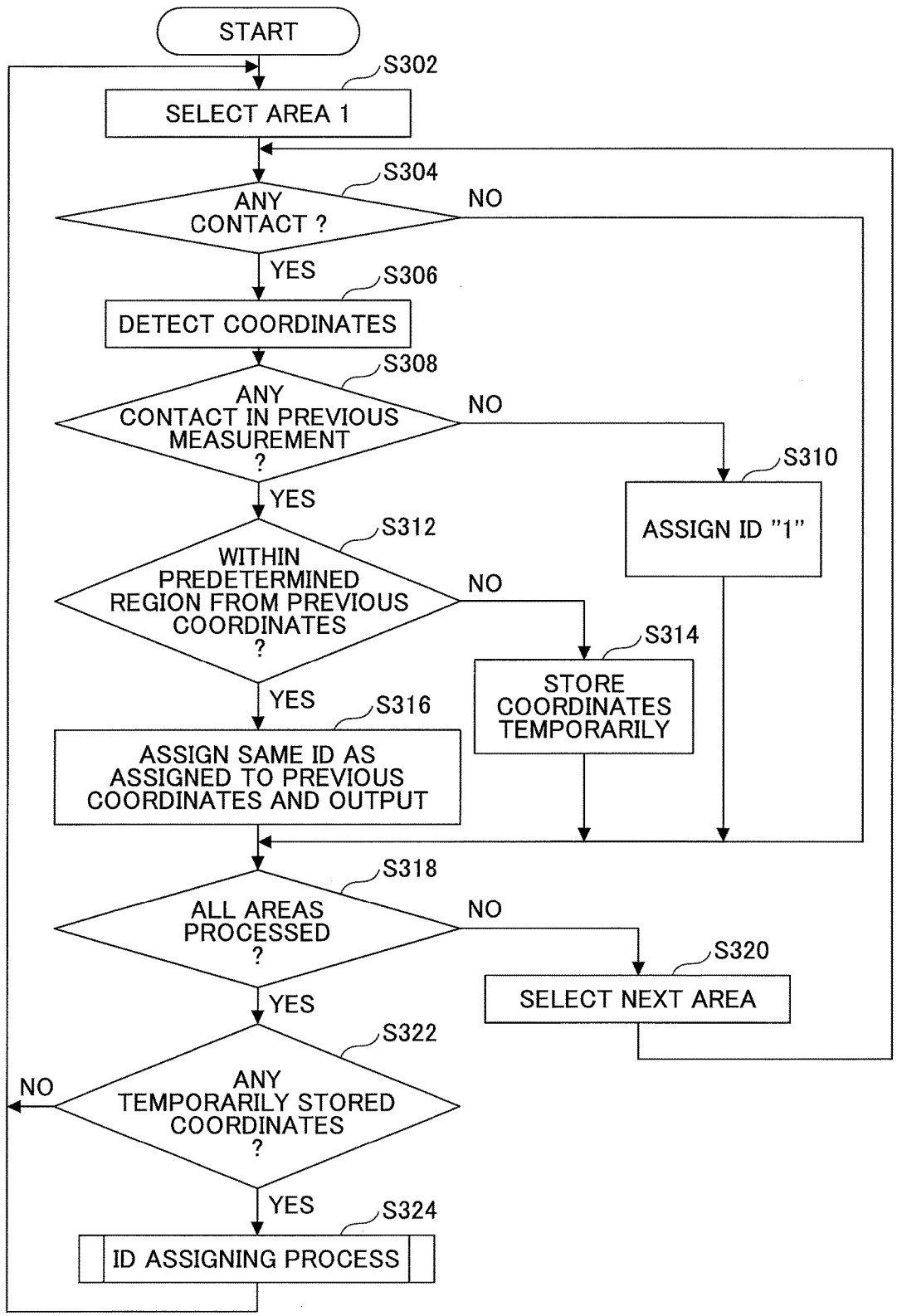
FIG. 16 is a flowchart of a position detecting method for a touchscreen panel according to the second embodiment of the present invention.

FIG. 16 is a flowchart of a position detecting method for a touchscreen panel according to the second embodiment. FIG. 17 is a diagram illustrating a configuration of the touchscreen panel 100 according to the second embodiment.

Referring to FIG. 17, according to this embodiment, the touchscreen panel 100 (the transparent conductive film 12) is divided widthwise and lengthwise (vertically and laterally) into four and eight units, respectively, into 32 areas in total. The divided areas are sequentially assigned respective numbers (1 to 32) as illustrated in FIG. 17.

First, in step S302 of FIG. 16, area 1 illustrated in FIG. 17 is selected. For example, a counter may be provided and set to 1 (N=1). Then, information such as the presence or absence of contact in area 1 is detected.

Next, in step S304, it is determined whether contact is made in the selected area (whether the selected area is contacted). If the selected area is contacted by a finger (fingertip) or the like, that is, there is a contact position in the selected area (YES in step S304), the process proceeds to step S306. On the other hand, if the selected area is not contacted by a finger or the like (NO in step S304), the process proceeds to step S318.

Next, in step S306, the position coordinates of the contact position of the finger or the like are detected. For example, the position coordinates of the contact position are detected by detecting an electric potential.

Next, in step S308, the presence or absence of a contact position in the previous (last) measurement is determined. For example, it is determined whether the touchscreen panel 100 was contacted by a finger or the like in the previous measurement. If the presence of a contact position in the previous measurement is determined (YES in step S308), the process proceeds to step S312. On the other hand, if the absence of a contact position in the previous measurement is determined (NO in step S308), the process proceeds to step S310.

Next, in step S310, the contact position is assigned ID "1" as a new contact position, and the position coordinates of the contact position are stored in the memory 251 and output by the output part 253.

Next, in step S312, it is determined whether the position coordinates of the contact position detected in step S306 are within a predetermined region around the position coordinates of the previous contact position as a center. If it is determined that the position coordinates of the contact position detected in step S306 are within a predetermined region around the position coordinates of the previous contact position as a center (YES in step S312), the process proceeds to step S316. On the other hand, if it is determined that the position coordinates of the contact position detected in step S306 are not within a predetermined region around the position coordinates of the previous contact position as a center (NO in step S312), the process proceeds to step S314.

Next, in step S314, the position coordinates of the contact position detected in step S306 are temporarily stored in the memory 251.

Next, in step S316, it is determined that the position coordinates of the previous contact position have moved (shifted) to the position coordinates of the contact position detected in step S306, and the position coordinates of the contact position detected in step S306 are stored in the memory 251 and output by the output part 253.

Figure 18A:
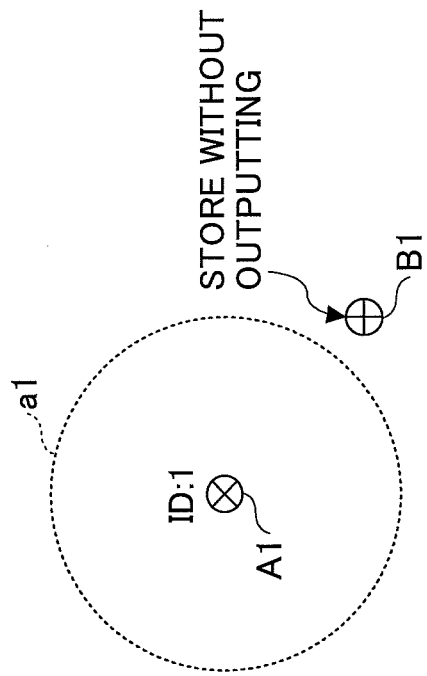
FIGS. 18A and 18B are diagrams illustrating the position detecting method for a touchscreen panel according to the second embodiment of the present invention.
Figure 18B:
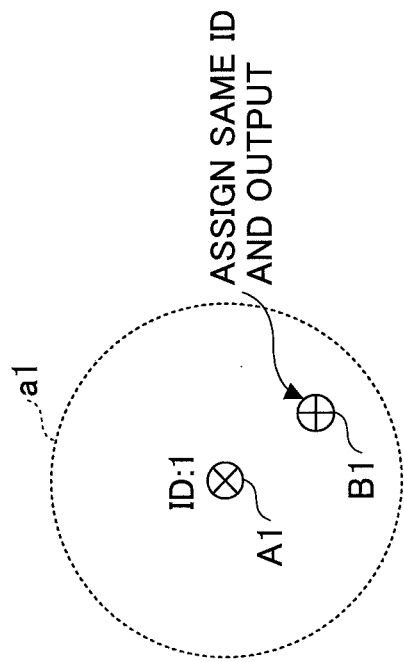

A description is given in more detail of steps S312 through S316 based on FIGS. 18A and 18B.

FIGS. 18A and 18B are diagrams illustrating the position detecting method for a touchscreen panel according to the second embodiment. The operation of this method is performed in, for example, the process part 252.

FIG. 18A illustrates the case where it is determined in step S312 that the position coordinates of contact position B1 detected in step S306 are within a predetermined region around the position coordinates of previous contact position A1 as a center and step S316 is performed. As illustrated in FIG. 18A, the position coordinates of contact position B1 detected in step S306 are within predetermined region a1 around the position coordinates of previous contact position A1 as a center. In this case, it is determined that the contact position has moved from A1 to B1. Accordingly, contact position B1 is assigned the same ID as assigned to contact position A1, and is output.

On the other hand, FIG. 18B illustrates the case where it is determined in step S312 that the position coordinates of contact position B1 detected in step S306 are not within a predetermined region around the position coordinates of previous contact position A1 as a center and step S314 is performed. In this case, as illustrated in FIG. 18B, the position coordinates of contact position B1 detected in step S306 are not within predetermined region a1 around the position coordinates of previous contact position A1 as a center. Accordingly, it is determined that contact position B1 is new. Therefore, the position coordinates of contact position B1 are temporarily stored in the memory 251.

Next, in step S318, it is determined whether the presence or absence of contact by a finger or the like has been determined in all of the areas of the touchscreen panel 100. For example, according to this embodiment, if the value N of the counter used in step S302 is 32, it is determined that the determination as to the presence or absence of contact by a finger or the like has been performed (completed) in all of the areas of the touchscreen panel 100. On the other hand, if the value N of the counter is less than 32, it is determined that the determination as to the presence or absence of contact by a finger or the like has not been performed (completed) in all of the areas of the touchscreen panel 100. If it is determined that the determination as to the presence or absence of contact by a finger or the like has been performed (completed) in all of the areas of the touchscreen panel 100 (YES in step S318), the process proceeds to step S322. On the other hand, if it is determined that the determination as to the presence or absence of contact by a finger or the like has not been performed (completed) in all of the areas of the touchscreen panel 100 (NO in step S318), the process proceeds to step S320.

Next, in step S320, the next area is selected. For example, the value N of the counter is incremented by one, and area 2 or area 9 in the touchscreen panel 100 is selected. Then, information such as the presence or absence of contact in area 2 or area 9 is detected. Thereafter, the process proceeds to step S304.

Next, in step S322, it is determined whether the position coordinates of any contact position are temporarily stored in the memory 251. For example, the presence or absence of the position coordinates of a contact position temporarily stored in the memory 251 in step S314 is determined. If it is determined that the position coordinates of a contact position are temporarily stored in the memory 251 (YES in step S322), the process proceeds to step S324. On the other hand, if it is determined that the position coordinates of no contact position are temporarily stored in the memory 251 (NO in step S322), the process proceeds to step S302, and detection of the coordinates of a contact position in the touchscreen panel 100 is newly started with area 1.

Next, in step S324, an ID assigning process is performed. This ID assigning process is performed in the subroutine illustrated in FIG. 19. After completion of the ID assigning process, the process proceeds to step S302. By repeating this operation, it is possible to determine the state of the movement of a contact position on the touchscreen panel 100.

Next, a description is given of the ID assigning process according to the second embodiment.

Figure 19:
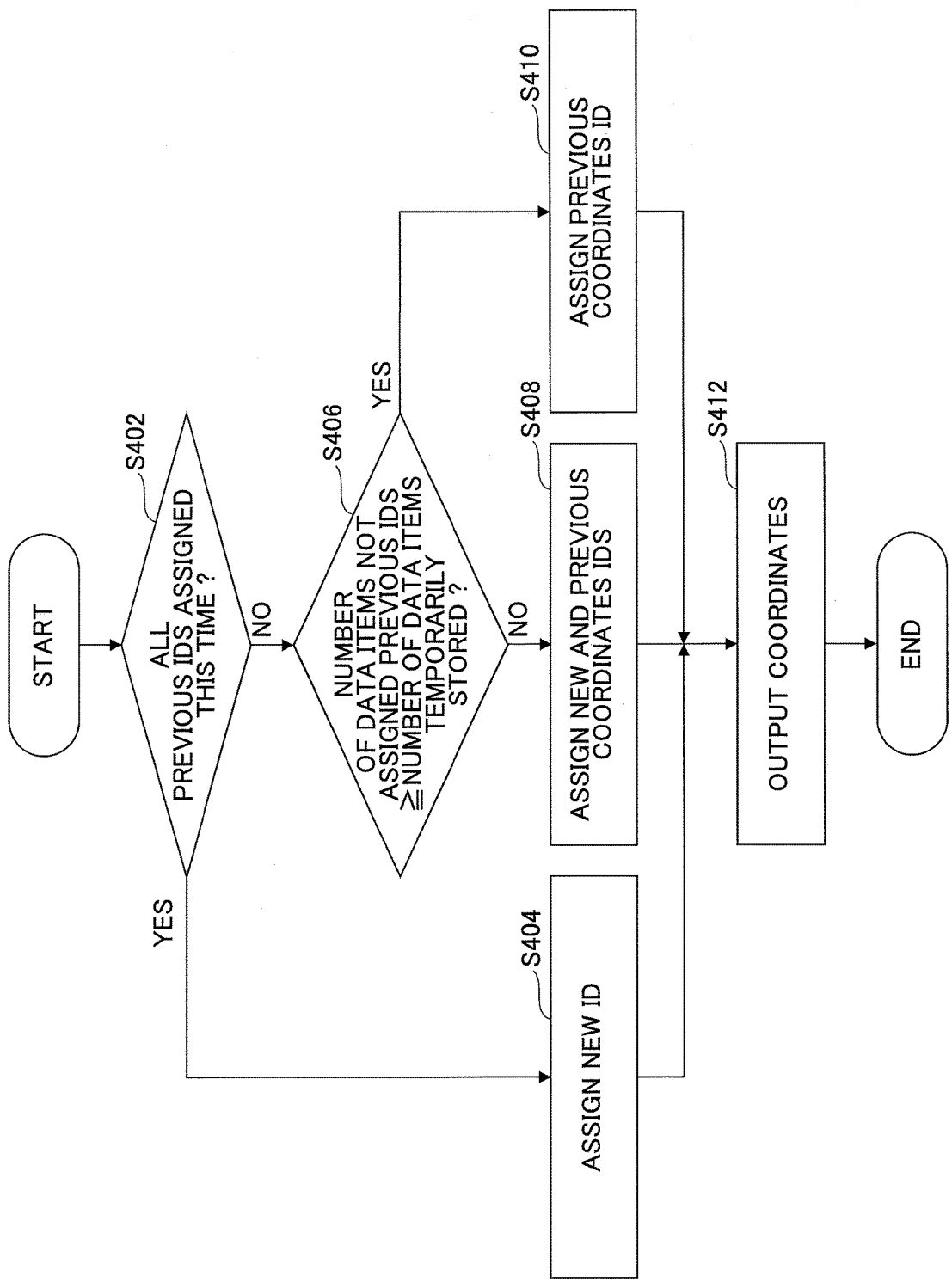
FIG. 19 is a flowchart of an ID assigning process according to the second embodiment of the present invention.

FIG. 19 is a flowchart of the ID assigning process according to the second embodiment.

This subroutine is performed in, for example, the process part 252 if the memory 251 contains contact position coordinates temporarily stored in step S314.

First, in step S402 of FIG. 19, it is determined whether all of contact positions assigned IDs the previous time (in the previous measurement) have been assigned IDs this time (in this measurement). If it is determined that all of contact positions assigned IDs the previous time have been assigned IDs this time (YES in step S402), the process proceeds to step S404. On the other hand, if it is determined that all of contact positions assigned IDs the previous time have not been assigned IDs this time, that is, one or more of the contact positions assigned IDs the previous time have not been assigned IDs this time (NO in step S402), the process proceeds to step S406.

Figure 20:
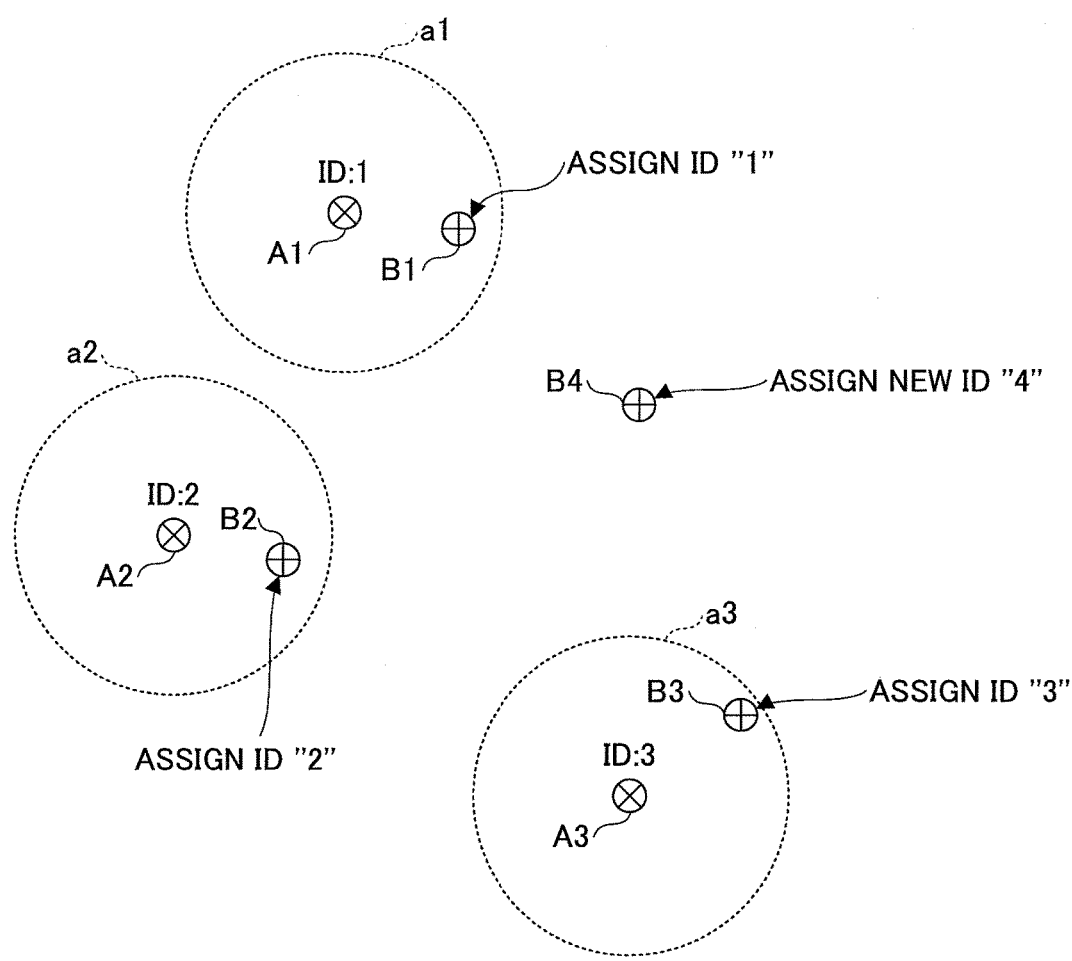
FIG. 20 is a diagram illustrating the position detecting method for a touchscreen panel according to the second embodiment of the present invention.

Next, in step S404, a new ID is assigned. For example, as illustrated in FIG. 20, it is determined that previous contact positions A1, A2, and A3 assigned respective IDs the previous time have moved to contact positions B1, B2 and B3, respectively, which are assigned the same IDs this time. Thus, all of ID "1," ID "2," and ID "3" have been assigned. That is, contact position B1 is within predetermined region a1 around the position coordinates of previous contact position A1 as a center, contact position B2 is within predetermined region a2 around the position coordinates of previous contact position A2 as a center, and contact position B3 is within predetermined region a3 around the position coordinates of previous contact position A3 as a center.

Further, it has been determined in step S322 that there is contact position B4 temporarily stored in the memory 251 in step S314. Therefore, ID "4" is newly assigned to the position coordinates of contact position B4. Thus, it is determined that in the touchscreen panel 100, the contact of ID "1" has moved from previous contact position A1 to contact position B1, the contact of ID "2" has moved from previous contact position A2 to contact position B2, the contact of ID "3" has moved from previous contact position A3 to contact position B3, and contact position B4 of ID "4" has been newly generated.

Next, in step S406, the number of contact positions assigned IDs the previous time but not assigned IDs this time and the number of contact positions temporarily determined in step S322 to be stored temporarily in the memory 251 are compared.

If the number of contact positions assigned IDs the previous time but not assigned IDs this time is smaller than the number of contact positions temporarily determined in step S322 to be stored temporarily in the memory 251 (NO in step S406), the process proceeds to step S408. On the other hand, if the number of contact positions assigned IDs the previous time but not assigned IDs this time is greater than or equal to the number of contact positions temporarily determined in step S322 to be stored temporarily in the memory 251 (YES in step S406), the process proceeds to step S410.

Figure 21:
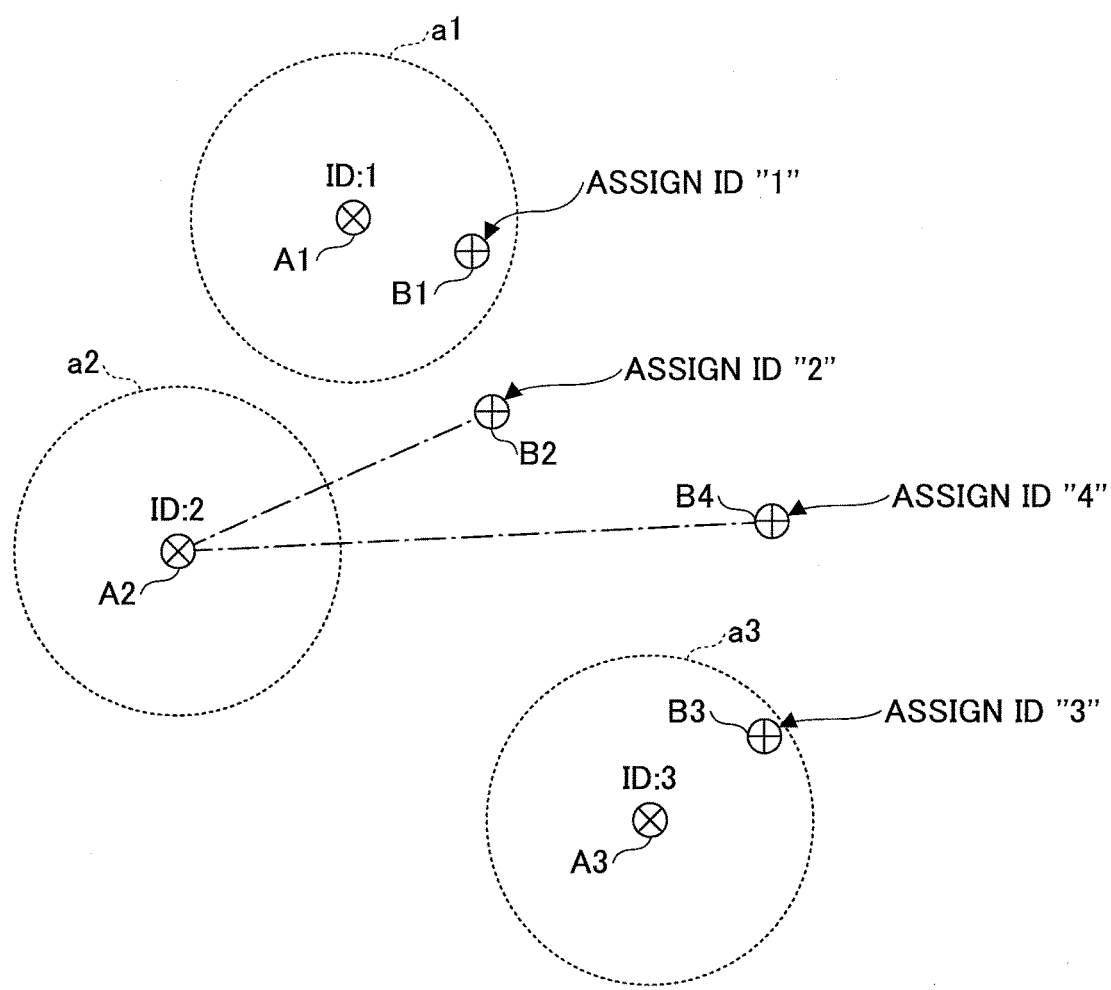
FIG. 21 is a diagram illustrating the position detecting method for a touchscreen panel according to the second embodiment of the present invention.

Next, in step S408, the ID of a previous contact position and a new ID are assigned. For example, as illustrated in FIG. 21, it is determined that contact positions A1 and A3 previously assigned IDs have moved to contact positions B1 and B3, respectively, which are assigned IDs this time. Thus, ID "1" and ID "2" have been assigned. That is, contact position B1 is within predetermined region a1 around the position coordinates of previous contact position A1 as a center, and contact position B3 is within predetermined region a3 around the position coordinates of previous contact position A3 as a center.

Further, contact positions B2 and B4 temporarily contained in the memory 251 are outside predetermined region a2 formed around the position coordinates of previous contact position A2 as a center. Of contact positions 22 and B4, contact position B2, closer to previous contact position A2 than is contact position B4, is assigned ID "2" and it is determined that previous contact position A2 has moved to contact position B2. Further, contact position B4, more distant from previous contact position A2 than is contact position B2, is determined as new contact, and the position coordinates of contact position B4 are newly assigned ID "4."

As a result, it is determined that in the touchscreen panel 100, the contact of ID "1" has moved from previous contact position A1 to contact position B1, the contact of ID "2" has moved from previous contact position A2 to contact position B2, the contact of ID "3" has moved from previous contact position A3 to contact position B3, and contact position B4 of ID "4" has been newly generated.

In step S410, the ID of the coordinates of a previous contact position is assigned.

Figure 22:
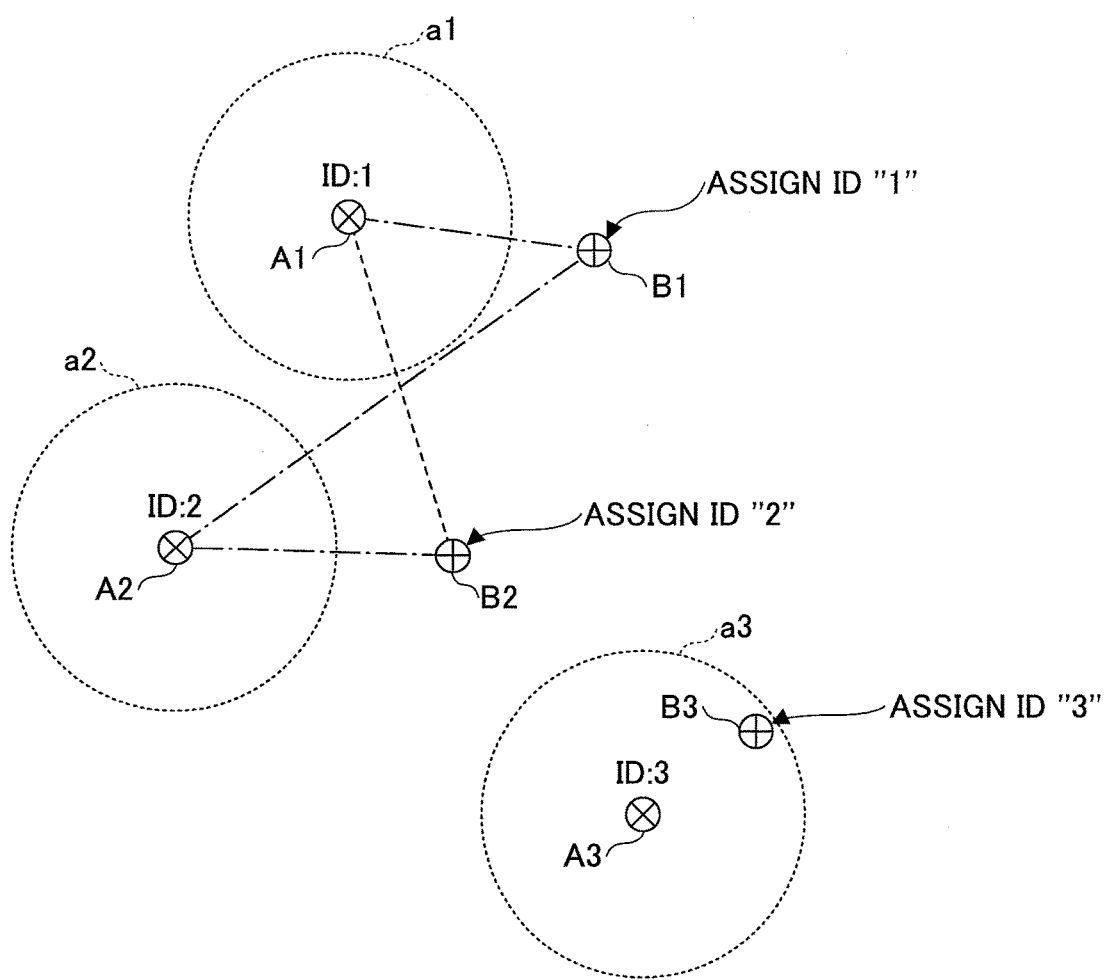
FIG. 22 is a diagram illustrating the position detecting method for a touchscreen panel according to the second embodiment of the present invention.

First, a description is given, with reference to FIG. 22, of the case where the number of contact positions assigned IDs the previous time but not assigned IDs this time is equal to the number of contact positions temporarily determined in step S322 to be stored temporarily in the memory 251.

Referring to FIG. 22, it is determined that contact position A3 previously assigned an ID has moved to contact position B3, which is assigned an ID this time. Thus, ID "3" has been assigned. That is, contact position B3 is within predetermined region a3 around the position coordinates of previous contact position A3 as a center.

Further, contact positions B1 and B2 temporarily stored in the memory 251 are outside predetermined region a1 formed around the position coordinates of previous contact position A1 as a center and predetermined region a2 formed around the position coordinates of previous contact position A2 as a center, respectively.

Of contact positions B1 and B2, contact position B1, closer to previous contact position A1 than is contact position B2, is assigned ID "1" and it is determined that previous contact position A1 has moved to contact position B1. Further, contact position B2, closer to previous contact position A2 than is contact position B1, is assigned ID "2" and it is determined that previous contact position A2 has moved to contact position B2. For example, the distance between previous contact position A1 and contact position B1 and the distance between previous contact position A1 and contact position B2 are compared, and the closer (to previous contact position A1) of the two contact positions B1 and B2 is assigned ID "1." Further, the distance between previous contact position A2 and contact position B1 and the distance between previous contact position A2 and contact position B2 are compared, and the closer (to previous contact position A2) of the two contact positions B1 and B2 is assigned ID "2."

As a result, it is determined that in the touchscreen panel 100, the contact of ID "1" has moved from previous contact position A1 to contact position B1, the contact of ID "2" has moved from previous contact position A2 to contact position B2, and the contact of ID "3" has moved from previous contact position A3 to contact position B3.

Figure 23:
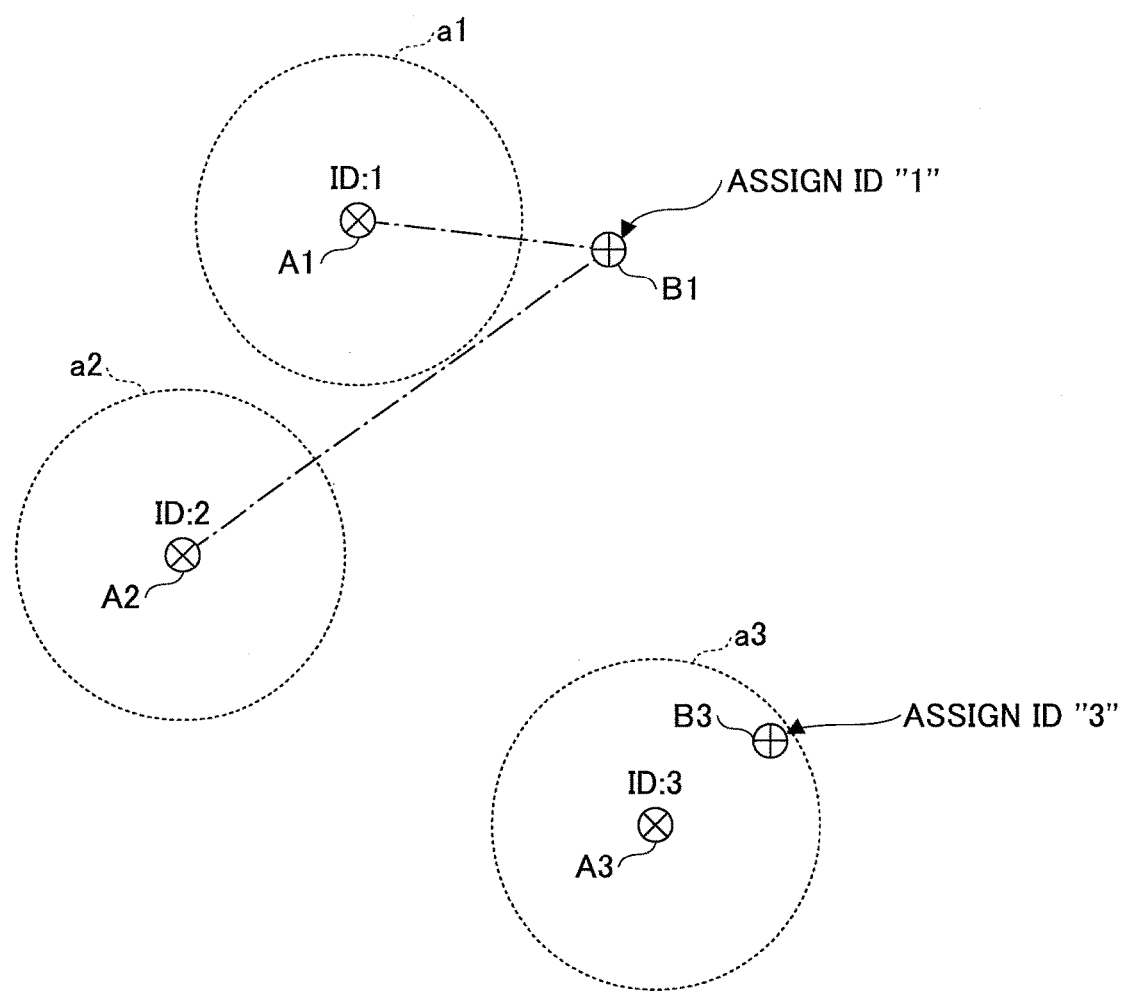
FIG. 23 is a diagram illustrating the position detecting method for a touchscreen panel according to the second embodiment of the present invention.

Next, a description is given, with reference to FIG. 23, of the case where the number of contact positions assigned IDs the previous time but not assigned IDs this time is greater than the number of contact positions temporarily determined in step S322 to be stored temporarily in the memory 251.

Referring to FIG. 23, it is determined that contact position A3 previously assigned an ID has moved to contact position B3, which is assigned an ID this time. Thus, ID "3" has been assigned. That is, contact position B3 is within predetermined region a3 around the position coordinates of previous contact position A3 as a center.

Further, contact position B1 temporarily stored in the memory 251 is outside predetermined region a1 formed around the position coordinates of previous contact position A1 as a center and predetermined region a2 formed around the position coordinates of previous contact position A2 as a center. Contact position B1 is closer to previous contact position A1 than to previous contact position A2. Accordingly, contact position B1 is assigned ID "1" and it is determined that previous contact position A1 has moved to contact position B2. For example, the distance between previous contact position A1 and contact position B1 and the distance between previous contact position A2 and contact position B1 are compared, and the ID of the closer (to contact position B1) of the two previous contact positions A1 and A2 is assigned to contact position B1.

Further, no contact position corresponding to previous contact position A2 has been detected this time. Therefore, it is determined that previous contact position A2 assigned ID "2" is no longer in contact. As a result, it is determined that in the touchscreen panel 100, the contact of ID "1" has moved from previous contact position A1 to contact position B1, the contact of ID "2" has disappeared, and the contact of ID "3" has moved from previous contact position A3 to contact position B3.

Next, in step S412, the position coordinates of the contact positions assigned IDs are output.

Thus, according to this embodiment, the relationship between a previous contact position and a current contact position may be determined based on the presence or absence of the current contact position within a predetermined region around the previous contact position as a center.

According to this embodiment, even when there are multiple contact points on a touchscreen panel, it is possible to determine the contact points with accuracy from the positional relationship between contact positions. The contact positions in the touchscreen panel are based on the assumption that one contact point is present in each of the divided region of the touchscreen panel.

[c] Third Embodiment

Next, a description is given of a third embodiment according to the present invention.

This embodiment relates to a method of determining the position coordinates of a contact position in the case where the contact position moves on the touchscreen panel 100 of the first embodiment. In this embodiment, the same touch panel unit as illustrated in FIG. 15 of the second embodiment may be used.

Figure 24:
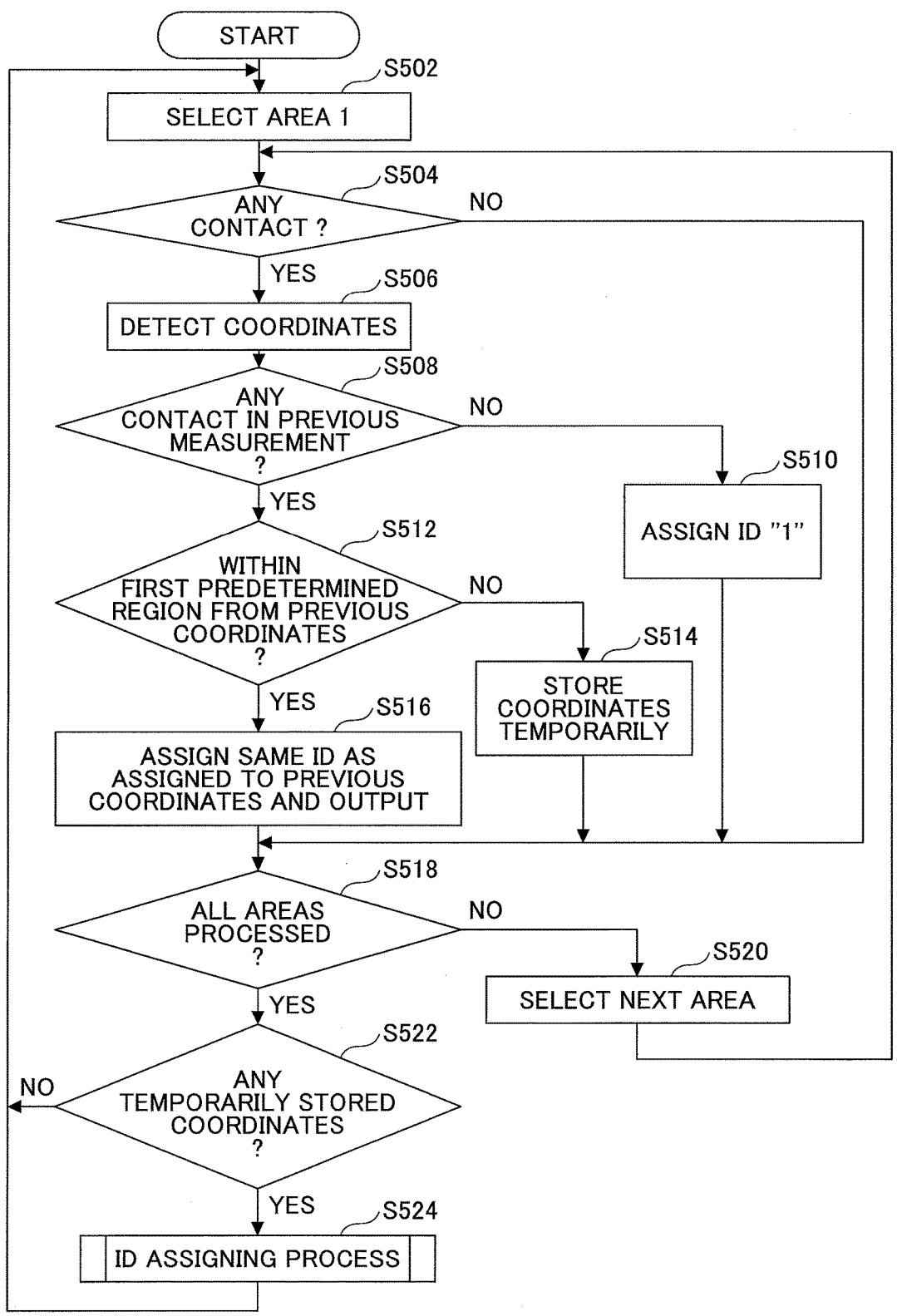
FIG. 24 is a flowchart of a position detecting method for a touchscreen panel according to a third embodiment of the present invention.

A description is given of this embodiment based on FIG. 24. The touchscreen panel 100 used in this embodiment may have the same configuration as illustrated in FIG. 17 of the second embodiment.

FIG. 24 is a flowchart of a position detecting method for a touchscreen panel according to the third embodiment.

First, in step S502 of FIG. 24, area 1 illustrated in FIG. 17 is selected. For example, a counter may be provided and set to 1 (N=1). Then, information such as the presence or absence of contact in area 1 is detected.

Next, in step S504, it is determined whether contact is made in the selected area (whether the selected area is contacted). If the selected area is contacted by a finger (fingertip) or the like, that is, there is a contact position in the selected area (YES in step S504), the process proceeds to step S506. On the other hand, if the selected area is not contacted by a finger or the like (NO in step S504), the process proceeds to step S518.

Next, in step S506, the position coordinates of the contact position of the finger or the like are detected. For example, the position coordinates of the contact position are detected by detecting an electric potential.

Next, in step S508, the presence or absence of a contact position in the previous measurement is determined. For example, it is determined whether the touchscreen panel 100 was contacted by a finger or the like in the previous measurement. If the presence of a contact position in the previous measurement is determined (YES in step S508), the process proceeds to step S512. On the other hand, if the absence of a contact position in the previous measurement is determined (NO in step S508), the process proceeds to step S510.

Next, in step S510, the contact position is assigned ID "1" as a new contact position, and the position coordinates of the contact position are stored in the memory 251 and output by the output part 253.

Next, in step S512, it is determined whether the position coordinates of the contact position detected in step S506 are within a first predetermined region around the position coordinates of the previous contact position as a center. If it is determined that the position coordinates of the contact position detected in step S506 are within the first predetermined region around the position coordinates of the previous contact position as a center (YES in step S512), the process proceeds to step S516. On the other hand, if it is determined that the position coordinates of the contact position detected in step S506 are not within the first predetermined region around the position coordinates of the previous contact position as a center (NO in step S512), the process proceeds to step S514.

Next, in step S514, the position coordinates of the contact position detected in step S506 are temporarily stored in the memory 251.

Next, in step S516, it is determined that the position coordinates of the previous contact position have moved (shifted) to the position coordinates of the contact position detected in step S506, and the position coordinates of the contact position detected in step S506 are stored in the memory 251 and output by the output part 253.

Figure 25B:
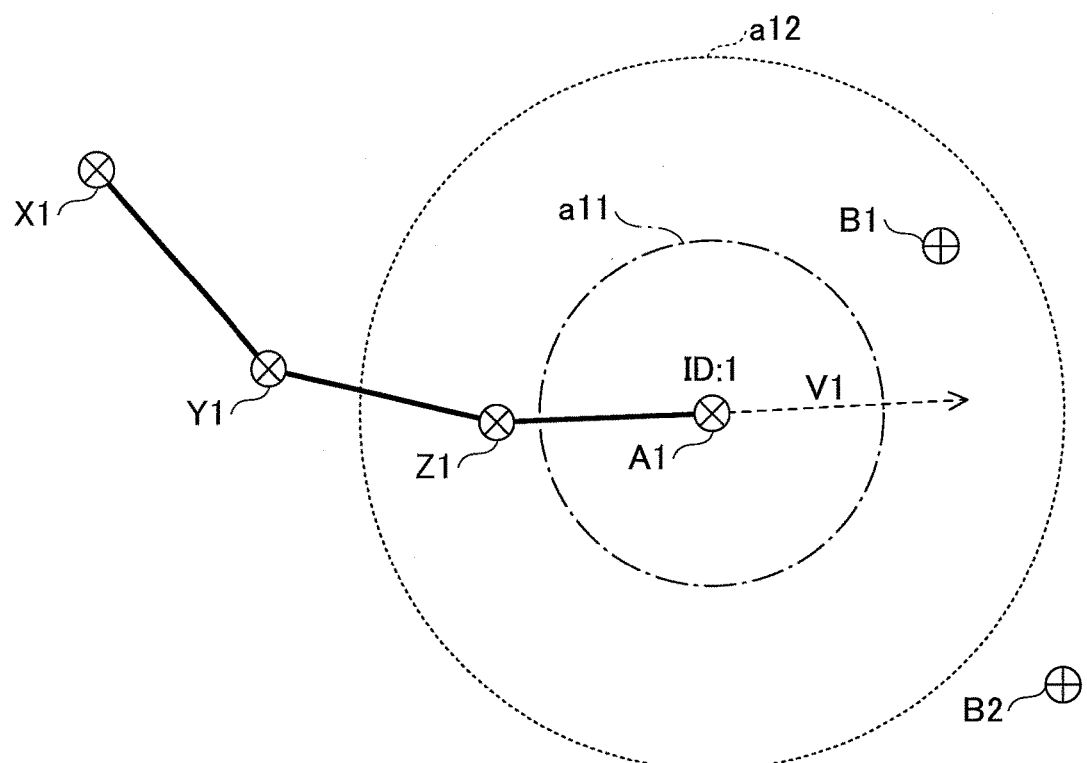

A description is given in more detail of steps S512 through S516 based on FIGS. 25A and 25B.

FIGS. 25A and 25B are diagrams illustrating the position detecting method for a touchscreen panel according to the third embodiment.

FIG. 25A illustrates the case where it is determined in step S512 that the position coordinates of the contact position detected in step S506 are within first predetermined region a11 around the position coordinates of the previous contact position as a center and step S516 is performed. As illustrated in FIG. 25A, the position coordinates of contact position B1 detected in step S506 are within first predetermined region a11 around the position coordinates of previous contact position A1 as a center. In this case, it is determined that the contact position has moved from A1 to B1. Accordingly, contact position B1 is assigned the same ID as assigned to contact position A1, and is output.

On the other hand, FIG. 25B illustrates the case where it is determined in step S512 that the position coordinates of the contact position detected in step S506 are not within first predetermined region a11 around the position coordinates of the previous contact position as a center and step S514 is performed. In this case, as illustrated in FIG. 25B, the position coordinates of contact positions B1 and B2 detected in step S506 are not within first predetermined region a11 around the position coordinates of previous contact position A1 as a center. Accordingly, the position coordinates of contact positions B1 and B2 are temporarily stored in the memory 251.

Next, in step S518, it is determined whether the presence or absence of contact by a finger or the like has been determined in all of the areas of the touchscreen panel 100. For example, according to this embodiment, if the value N of the counter used in step S502 is 32, it is determined that the determination as to the presence or absence of contact by a finger or the like has been performed (completed) in all of the areas of the touchscreen panel 100. On the other hand, if the value N of the counter is less than 32, it is determined that the determination as to the presence or absence of contact by a finger or the like has not been performed (completed) in all of the areas of the touchscreen panel 100. If it is determined that the determination as to the presence or absence of contact by a finger or the like has been performed (completed) in all of the areas of the touchscreen panel 100 (YES in step S518), the process proceeds to step S522. On the other hand, if it is determined that the determination as to the presence or absence of contact by a finger or the like has not been performed (completed) in all of the areas of the touchscreen panel 100 (NO in step S518), the process proceeds to step S520.

Next, in step S520, the next area is selected. For example, the value N of the counter is incremented by one, and area 2 or area 9 in the touchscreen panel 100 is selected. Then, information such as the presence or absence of contact in area 2 or area 9 is detected. Thereafter, the process proceeds to step S504.

Next, in step S522, it is determined whether the position coordinates of any contact position are temporarily stored in the memory 251. For example, the presence or absence of the position coordinates of a contact position temporarily stored in the memory 251 in step S514 is determined. If it is determined that the position coordinates of a contact position are temporarily stored in the memory 251 (YES in step S522), the process proceeds to step S524. On the other hand, if it is determined that the position coordinates of no contact position are temporarily stored in the memory 251 (NO in step S522), the process proceeds to step S502, and detection of the coordinates of a contact position in the touchscreen panel 100 is newly started with area 1.

Next, in step S524, an ID assigning process is performed. This ID assigning process is performed in the subroutine illustrated in FIG. 26. After completion of the ID assigning process, the process proceeds to step S502. By repeating this operation, it is possible to determine the state of the movement of a contact position on the touchscreen panel 100.

Next, a description is given of the ID assigning process according to the third embodiment.

Figure 26:
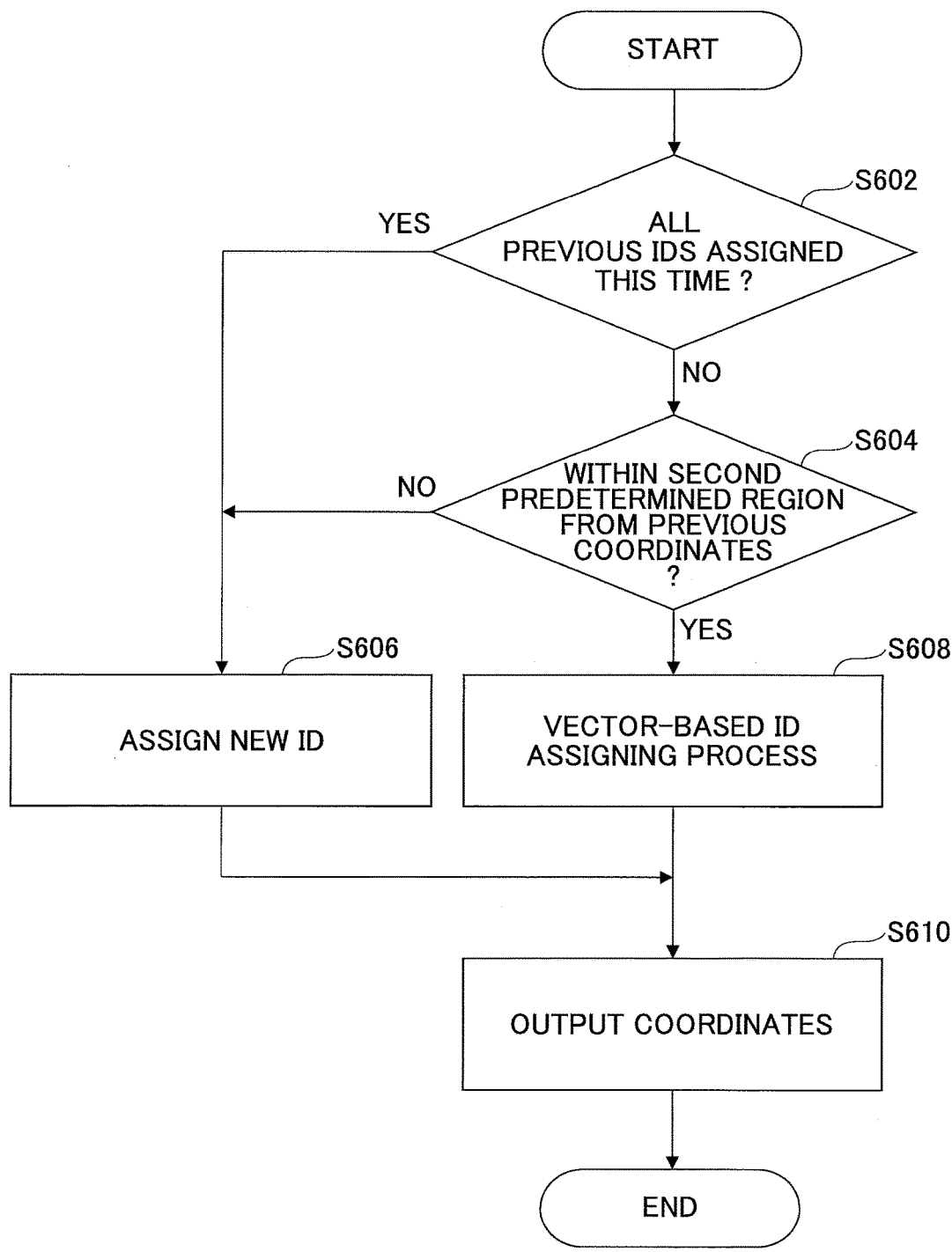
FIG. 26 is a flowchart of an ID assigning process according to the third embodiment of the present invention.

FIG. 26 is a flowchart of the ID assigning process according to the third embodiment.

This subroutine is performed in, for example, the process part 252 if the memory 251 contains contact position coordinates temporarily stored in step S514.

First, in step S602 of FIG. 26, it is determined whether all of contact positions assigned IDs the previous time (in the previous measurement) have been assigned IDs this time (in this measurement). If it is determined that all of contact positions assigned IDs the previous time have been assigned IDs this time (YES in step S602), the process proceeds to step S606. On the other hand, if it is determined that all of contact positions assigned IDs the previous time have not been assigned IDs this time, that is, one or more of the contact positions assigned IDs the previous time have not been assigned IDs this time (NO in step S602), the process proceeds to step S604.

Next, in step S604, it is determined whether the position coordinates of the contact position temporarily stored in the memory 251 are within a second predetermined region around the position coordinates of the previous contact position as a center. If it is determined that the position coordinates of the contact position temporarily stored in the memory 251 are within the second predetermined region around the position coordinates of the previous contact position as a center (YES in step S604), the process proceeds to step S608. On the other hand, if it is determined that the position coordinates of the contact position temporarily stored in the memory 251 are not within a second predetermined region around the position coordinates of the previous contact position as a center (NO in step S604), the process proceeds to step S606.

Next, in step S606, a new ID is assigned. For example, as illustrated in FIG. 25B, if the position coordinates of contact position B2 temporarily stored in the memory 251 are outside second predetermined region a12 formed around the position coordinates of previous contact position A1 as a center, new ID "2" is assigned to the position coordinates of contact position B2. Further, in the case of determining that all of contact positions assigned IDs the previous time have been assigned IDs this time (YES in step S602), the same determination as in the case illustrated in FIG. 20 is made.

Next, in step S608, an ID assigning process based on (using) a vector (a vector-based ID assigning process) is performed. For example, as illustrated in FIG. 25B, the contact position has a trace from contact position X1 to contact position Y1 to contact position Z1 to contact position A1 in this order. Reference vector V1 is determined from previous (last) contact position A1 and penultimate contact position Z1, and a determination is made, based on (with reference to) this reference vector V1, with respect to contact position B1 detected outside first predetermined region a11 and inside second predetermined region a12. Since contact position B1 is an only contact position within second predetermined region a12, contact position B1 is assigned ID "1."

Figure 27:
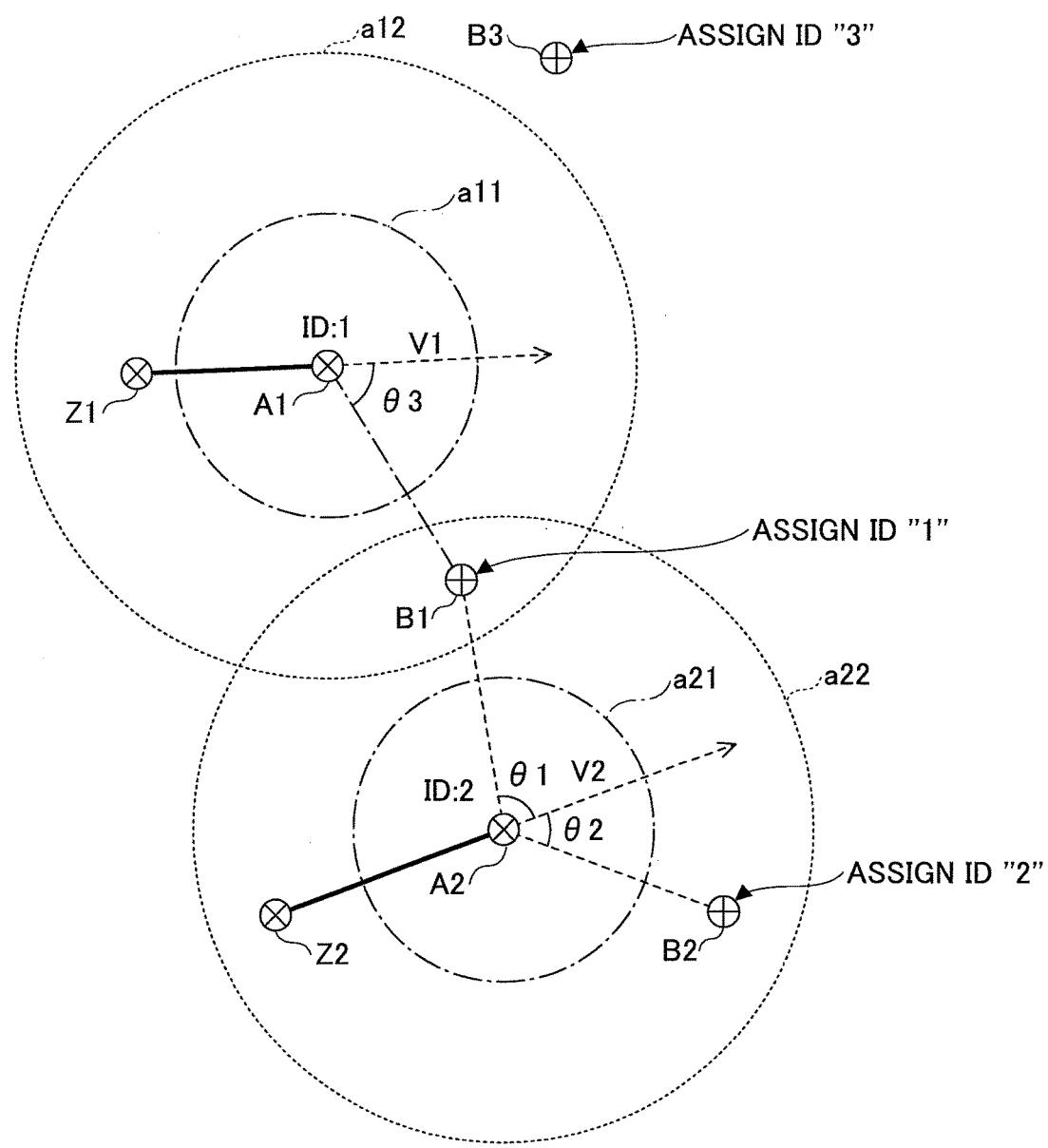
FIG. 27 is a diagram illustrating the position detecting method for a touchscreen panel according to the third embodiment of the present invention.

Next, consideration is given to the case illustrated in FIG. 27. That is, consideration is given to the case where there is no newly-detected coordinate position within first predetermined region a11 around previous contact position A1 as a center; there is newly-detected contact position B1 outside first predetermined region a11 and inside second predetermined region a12 around previous contact position A1 as a center; there is no newly-detected coordinate position within first predetermined region a21 around previous contact position A2 as a center; there are newly-detected coordinate positions B1 and B2 outside first predetermined region a21 and inside second predetermined region a22 around previous contact position A2 as a center; and there is contact position B3 outside second predetermined region a12 and outside second predetermined region a22. In this case, contact position B3 is assigned ID "3."

Next, a determination is made with respect to contact positions in descending order of the number of newly-detected coordinate positions within the second predetermined region. In the case illustrated in FIG. 27, there are two newly-detected coordinate positions B1 and B2 outside first predetermined region a21 and inside second predetermined region a22 around previous contact position A2 as a center, and there is one newly-detected contact position B1 outside first predetermined region a11 and inside second predetermined region a12 around previous contact position A1 as a center.

Accordingly, a determination is made first with respect to two newly-detected coordinate positions B1 and B2 outside first predetermined region a21 and inside second predetermined region a22 around previous contact position A2 as a center. For example, reference vector V2 is determined from previous (last) contact position A2 and penultimate contact position Z2.

Thereafter, angle θ1 formed by a line connecting previous contact position A2 and contact position B1 and vector V2 is determined. Further, angle θ2 formed by a line connecting previous contact position A2 and contact position B2 and vector V2 is determined. In the case illustrated in FIG. 27, angle θ2 is smaller than angle θ1. Accordingly, contact position B2 is assigned ID "2."

Thereafter, contact position B1, which is the only contact position within second predetermined region a12 around previous contact position A1 as a center, is assigned ID "1."

Reference vector V1 may be determined from previous (last) contact position A1 and penultimate contact position Z1 and angle θ3 formed by a line connecting previous contact position A1 and contact position B1 and vector V1 may be determined as required.

Figure 28:
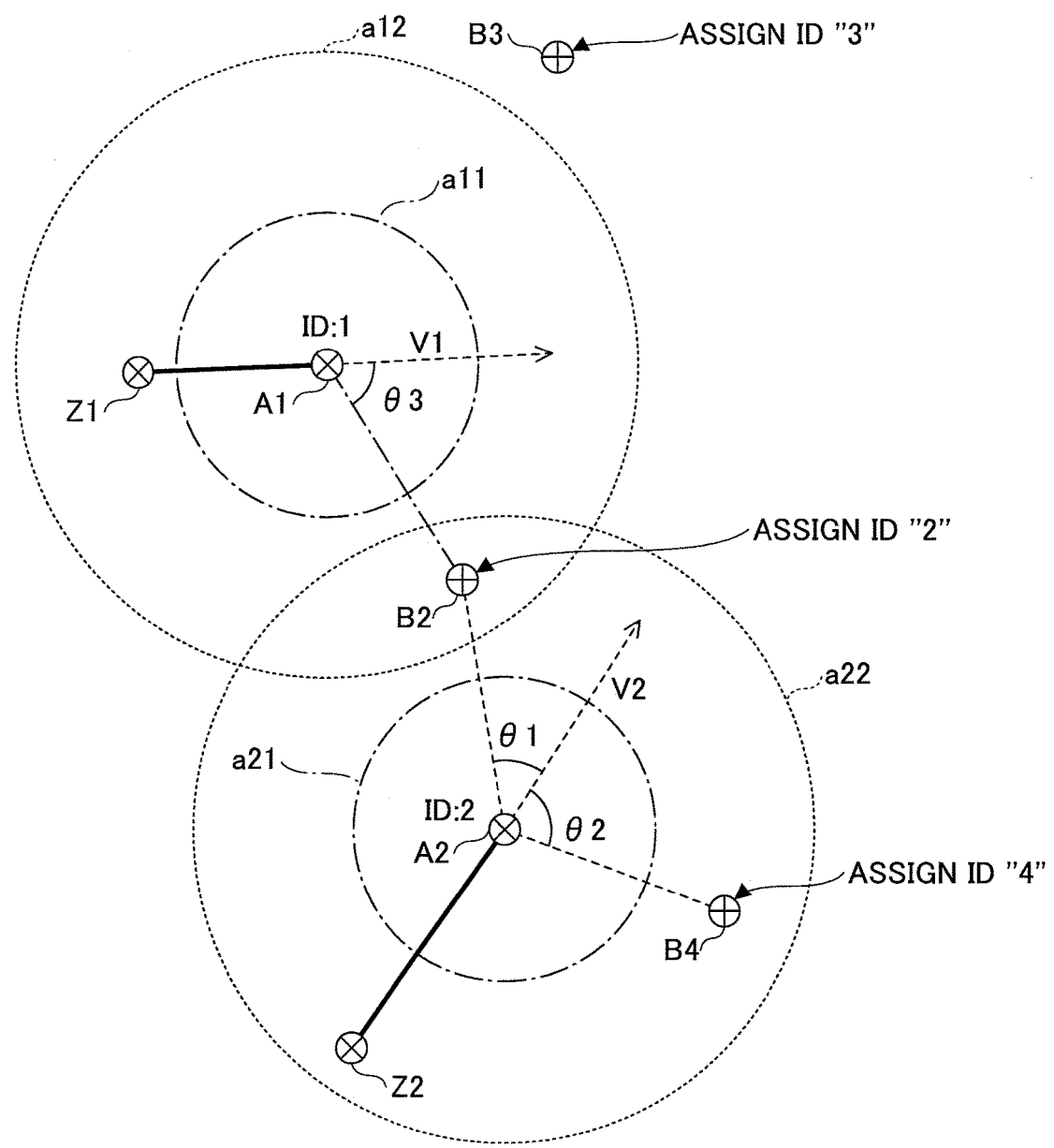
FIG. 28 is a diagram illustrating the position detecting method for a touchscreen panel according to the third embodiment of the present invention.

Next, consideration is given to the case illustrated in FIG. 28. In this case, the process up to the assignment of ID "3" to contact position B3 described above is the same as in the case illustrated in FIG. 27.

Thereafter, a determination is made with respect to contact positions in descending order of the number of newly-detected coordinate positions within the second predetermined region. In the case illustrated in FIG. 28, there are two newly-detected coordinate positions B2 and B4 outside first predetermined region a21 and inside second predetermined region a22 around previous contact position A2 as a center, and there is one newly-detected contact position B2 outside first predetermined region a11 and inside second predetermined region a12 around previous contact position A1 as a center.

Accordingly, a determination is made first with respect to two newly-detected coordinate positions B2 and B4 outside first predetermined region a21 and inside second predetermined region a22 around previous contact position A2 as a center. For example, reference vector V2 is determined from previous (last) contact position A2 and penultimate contact position Z2.

Thereafter, angle θ1 formed by a line connecting previous contact position A2 and contact position B2 and vector V2 is determined. Further, angle θ2 formed by a line connecting previous contact position A2 and contact position B4 and vector V2 is determined. In the case illustrated in FIG. 28, angle θ1 is smaller than angle θ2. Accordingly, contact position B2 is assigned ID "2."

Thereafter, contact position B4, which is within second predetermined region a22 around previous contact position A2 as a center, is assigned ID "4."

Further, there is no coordinate position to which previous contact position A1 seems to have moved. Accordingly, it is determined that the contact is lost, that is, the contact position has disappeared with respect to contact position A1.

Next, in step S610, the contact positions assigned IDs are output.

Thereby, according to this embodiment, even when there are multiple contact points on a touchscreen panel, it is possible to determine the contact points with accuracy using a reference vector serving as the trace of contact positions. The contact positions in the touchscreen panel are based on the assumption that one contact point is present in each of the divided region of the touchscreen panel, that is, each of the divided regions illustrated in FIG. 17. The third embodiment may be the same as the second embodiment except for the process described above.

[d] Fourth Embodiment

The present invention may be applied to five-wire resistive-film touchscreen panels. For example, the present invention is suitable for information processing apparatuses where a display employs a five-wire resistive-film touchscreen panel. Examples of information processing apparatuses in this case include cellular phones, personal digital assistants (PDAs), portable music players, portable video players, portable browsers, 1seg tuners, electronic dictionaries, automotive navigation systems, computers, point-of-sale (POS) terminals, inventory control terminals, automated-teller machines (ATMs), and various multimedia terminals.

Figure 29:
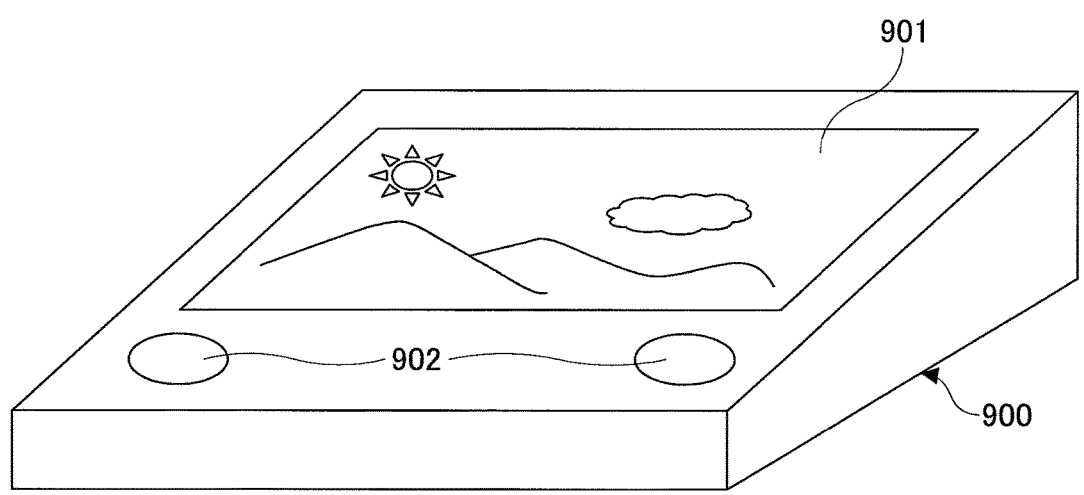
FIG. 29 is a diagram illustrating an electronic apparatus according to a fourth embodiment of the present invention.

FIG. 29 is a diagram illustrating an example of an electronic apparatus having the touchscreen panel in accordance with any of the embodiments described above according to a fourth embodiment of the present invention. In this example, the electronic apparatus is formed by a digital photo frame (or digital media frame) 900.

The digital photo frame 900 illustrated in FIG. 29 includes a touchscreen panel 901 and buttons (or switches) 902 that are provided on a housing (or casing), and a driving circuit, such as the driver circuit 130 illustrated in FIG. 9 or the driver circuit 239 illustrated in FIG. 15, that is electrically connected to the touchscreen panel 901 and is provided within the housing. For example, one of the buttons 902 may be pushed to turn ON or turn OFF the power of the digital photo frame 900. The other of the buttons 902 may be pushed to switch the display on the touchscreen panel 901 between the photograph and an operation menu, for example. Other inputs or instructions to the digital photo frame 900 may be made by pressing the appropriate portions within the displayed operation menu, for example. The user may simultaneously press a plurality of portions within the displayed operation menu.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority or inferiority of the invention. Although the embodiments of the present invention have been described in detail, the present invention is not limited to the specifically disclosed embodiments, and it should be understood that various changes, substitutions, and alterations could be made hereto without departing from the spirit and scope of the invention.

What is claimed is:

1. A position detecting method for a touchscreen panel on which a conductive film divided into a plurality of conductive regions is formed, the position detecting method comprising:
    conducting a first sequential scanning, the first sequential scanning sequentially scanning the conductive regions one by one to determine whether the touchscreen panel is contacted with respect to each of the conductive regions;
    detecting a first contacted position on the touchscreen panel at which the touchscreen panel is contacted within a first conductive region among the conductive regions during the first sequential scanning;
    conducting a second sequential scanning after conducting the first sequential scanning, the second sequential scanning sequentially scanning the conductive regions one by one to determine whether the touchscreen panel is contacted with respect to each of the conductive regions;
    detecting a second contacted position on the touchscreen panel at which the touchscreen panel is contacted within a second conductive region among the conductive regions during the second sequential scanning;
    determining whether the detected second contacted position is within or outside a predetermined region around the detected first contacted position; and
    determining that a contact with the touchscreen panel has moved on the touchscreen panel from the detected first contacted position to the detected second contacted position in response to determining that the detected second contacted position is within the predetermined region.

2. The position detecting method as claimed in claim 1, further comprising:
    determining that the touchscreen panel is newly contacted at the detected second contacted position or that a contact with the touchscreen panel at the detected first contacted position is lost, in response to determining that the detected second contacted position is outside the predetermined region.

3. The position detecting method as claimed in claim 1, further comprising:
    determining, when said detecting the first contacted position detects two or more first contacted positions and the detected second contacted position is outside the predetermined region around each of the detected two or more first contacted positions, that the contact with the touchscreen panel has moved from one of the detected two or more first contacted positions closest to the detected second contacted position to the detected second contacted position.

4. The position detecting method as claimed in claim 1, further comprising:
    determining, when said detecting the second contacted position detects two or more second contacted positions and the detected two or more second contacted positions are outside the predetermined region around the detected first contacted position, that the contact with the touchscreen panel has moved from the detected first contacted position to one of the detected two or more second contacted positions closest to the detected first contacted position.

5. The position detecting method as claimed in claim 1, further comprising:
    determining whether the detected second contacted position is within an additional predetermined region around the detected first contacted position, the additional predetermined region being located lateral to the predetermined region; and
    determining that the contact with the touchscreen panel has moved from the detected first contacted position to the detected second contacted position in response to determining that the detected second contacted position is outside the predetermined region but inside the additional predetermined region.

6. The position detecting method as claimed in claim 5, further comprising:
    determining, when said detecting the second contacted position detects two or more second contacted positions and the detected two or more second positions are outside the predetermined region but inside the additional predetermined region, that the contact with the touchscreen panel has moved from the detected first contacted position to one of the detected two or more second positions in which an angle of a line connecting the detected first contacted position and the one of the detected two or more second positions relative to a reference vector between the detected first contacted position and a position of the contact detected during a third sequential scanning of the conductive regions prior to the first sequential scanning is smallest.

7. The position detecting method as claimed in claim 1, wherein it is determined whether coordinates of the detected second contacted position are within or outside the predetermined region around coordinates of the detected first contacted position serving as a center in said determining whether the detected second contacted position is within or outside the predetermined region.

8. The position detecting method as claimed in claim 1, wherein it is determined that the contact of a single object with the touchscreen panel has moved on the touchscreen panel in said determining that the contact with the touchscreen panel has moved on the touchscreen panel, the single object including a fingertip.

9. The position detecting method as claimed in claim 1, further comprising:
   assigning the detected second contacted position a same ID as assigned to the detected first contacted position in response to determining that the contact with the touchscreen panel has moved on the touchscreen panel from the detected first contacted position to the detected second contacted position.

* * * * *